US012802041B2

(12) United States Patent
Bhatia

(10) Patent No.: US 12,802,041 B2
(45) Date of Patent: Nov. 17, 2026

(54) ARTIFICIAL INTELLIGENCE AGENT

(71) Applicant: Sanjay Bhatia, Fort Lauderdale, FL (US)

(72) Inventor: Sanjay Bhatia, Fort Lauderdale, FL (US)

( * ) Notice: Subject to any disclaimer, the term of this patent is extended or adjusted under 35 U.S.C. 154(b) by 125 days.

(21) Appl. No.: 18/520,788

(22) Filed: Nov. 28, 2023

(65) Prior Publication Data

US 2024/0177119 A1 May 30, 2024

Related U.S. Application Data

(63) Continuation-in-part of application No. 18/198,998, filed on May 18, 2023.

(Continued)

(51) Int. Cl.
*G06Q 10/1093* (2023.01)
*G06F 16/3329* (2025.01)

(Continued)

(52) U.S. Cl.
CPC ..... *G06Q 10/1093* (2013.01); *G06F 16/3329* (2019.01); *G06F 16/90332* (2019.01);

(Continued)

(58) Field of Classification Search
CPC ............ G06Q 10/1095; G06F 16/3329; G06F 16/90332; G06F 40/20; G06F 40/30;

(Continued)

(56) References Cited

U.S. PATENT DOCUMENTS

2016/0344777 A1* 11/2016 Fahlgren ............. H04L 65/1073
2019/0019159 A1* 1/2019 Champaneria ..... G06Q 10/1053

(Continued)

FOREIGN PATENT DOCUMENTS

EP 4530807 A1 * 4/2025 ............. G06F 9/451
WO WO-2023149939 A1 * 8/2023 ......... H04L 12/1818

OTHER PUBLICATIONS

A. G. Nanos and A. E. James, "A Virtual Meeting System for the New Age," 2013 IEEE 10th International Conference on e-Business Engineering, Coventry, UK, 2013, pp. 98-105 (Year: 2013).*

(Continued)

*Primary Examiner* — Crystol Stewart
(74) *Attorney, Agent, or Firm* — Clements Bernard Walker; Christopher L. Bernard; Devin Cummins

(57) ABSTRACT

The present disclosure relates to an artificial intelligence agent. In some embodiments, a method includes receiving a meeting message from a host, where the meeting message initiates a meeting to be scheduled, and where the meeting message includes an invite list of at least one meeting participant; sending at least one invitation message to the at least one meeting participant, where the at least one invitation message provides meeting acceptance options; generating a human-like response in a user interface; enabling in the user interface a conversation between the human-like response and the at least one meeting participant; receiving, from the at least one meeting participant during the conversation, one or more questions about the hos; and sending, to the at least one meeting participant during the conversation, information responsive to the one or more questions about the host.

18 Claims, 40 Drawing Sheets

3800

Related U.S. Application Data

(60) Provisional application No. 63/428,130, filed on Nov. 28, 2022.

(51) Int. Cl.

| | |
|---|---|
| ***G06F 16/9032*** | (2019.01) |
| ***G06F 40/20*** | (2020.01) |
| ***G06F 40/30*** | (2020.01) |
| ***G06N 3/006*** | (2023.01) |
| ***H04L 12/18*** | (2006.01) |
| ***H04L 41/22*** | (2022.01) |
| ***H04L 51/02*** | (2022.01) |
| ***H04L 51/04*** | (2022.01) |
| ***H04L 51/18*** | (2022.01) |
| ***H04L 51/56*** | (2022.01) |

(52) U.S. Cl.

CPC .............. *G06F 40/20* (2020.01); *G06F 40/30* (2020.01); *G06N 3/006* (2013.01); *H04L 12/1818* (2013.01); *H04L 41/22* (2013.01); *H04L 51/02* (2013.01); *H04L 51/04* (2013.01); *H04L 51/18* (2013.01); *H04L 51/56* (2022.05)

(58) Field of Classification Search

CPC ..... G06N 3/006; H04L 12/1818; H04L 41/22; H04L 51/02; H04L 51/04; H04L 51/18; H04L 51/56

See application file for complete search history.

(56) References Cited

U.S. PATENT DOCUMENTS

| | | | | |
|---|---|---|---|---|
| 2022/0067292 | A1* | 3/2022 | Rastogi | G06F 40/30 |
| 2022/0164683 | A1* | 5/2022 | Hao | G06F 40/30 |
| 2022/0358448 | A1* | 11/2022 | Beringer | G06Q 10/063118 |
| 2023/0012852 | A1* | 1/2023 | Szmigiel | G10L 15/22 |
| 2023/0046890 | A1* | 2/2023 | Ost | G06Q 10/1095 |
| 2023/0214782 | A1* | 7/2023 | Ram | G06F 40/40<br>704/9 |
| 2025/0028579 | A1* | 1/2025 | Mehmeri | H04L 12/1831 |

OTHER PUBLICATIONS

Cranshaw et al., Calendar.help: Designing a Workflow-Based Scheduling Agent with Humans in the Loop, Mar. 24, 2017, ACM, CHI' 17, p. 2382-2393 (Year: 2017).*

* cited by examiner

100

300

400

500

1200

1300

1400

1500

FIG. 16
5:57
Rande.app
Great News!
You have successfully created
Team Meeting
Pending: Day & Time
Duration: 60 mins
18388 N. Las Olas Blvd.
https://www.linktowhatever.com/
"Looking forward to our Randevous."
DONE

1600

1700

1800

1900

2000

2100

2200

2300

2400

2500

2600

2700

2800

2900

FIG. 30
Event Details
Team Meeting
Monday 06/07/20
2:00PM- 3:00PM
Duration: 60 Mins
18398 N. Las Olas Blvd.
https://www.linktowhatever.com/
"Looking forward to our Randevous."
Who's Attending
Great News!
You have successfully joined
Team Meeting
Monday 06/07/20
2:00PM- 3:00PM
18398 N. Las Olas Blvd.
https://www.linktowhatever.com/
"Looking forward to our Randevous."

3000

3100

3200

3300

3400

3500

3600

3700

3800

3900

4000

ARTIFICIAL INTELLIGENCE AGENT

INTRODUCTION

The present disclosure relates generally to networking and scheduling. More particularly, the present disclosure relates to systems and methods for a scheduling application with an artificial intelligence (AI) agent. As remote working expands, it is becoming increasingly important to utilize digital meeting applications and platforms. The workspace had transformed from in person collaboration to digital collaboration. A shift towards a landscape of upwardly mobile consumers, remote workers, bring-your-own-device (BYOD) policies, and a globally geo-dispersed workforce have continued to test workflows of many organizations. This can introduce many complications when teams are working on collaborative projects, as finding meeting times that accommodate each and every participant can prove to be challenging. Existing solutions help set up appointments 1-on-1 but fail to scale to teams.

BRIEF SUMMARY OF THE DISCLOSURE

The present disclosure relates to an artificial intelligence (AI) agent that enables users to efficiently and conveniently schedule team collaboration meetings, and enables meeting participants to ask questions about the host of meetings and receive responses to questions. The system collects input data from each meeting participant and utilizes AI to provide responses to questions that are posed by meeting participants.

In one illustrative embodiment, the present disclosure provides a system that includes one or more processors, and logic encoded in one or more non-transitory computer-readable storage media for execution by the one or more processors. When executed by the one or more processors, the logic is operable to cause the one or more processors to perform operations including: receiving a meeting message from a host, where the meeting message initiates a meeting to be scheduled, and where the meeting message includes an invite list of at least one meeting participant; sending at least one invitation message to the at least one meeting participant, where the at least one invitation message provides meeting acceptance options; generating a human-like response in a user interface; enabling in the user interface a conversation between the human-like response and the at least one meeting participant; receiving, from the at least one meeting participant during the conversation, one or more questions about the host; and sending, to the at least one meeting participant during the conversation, information responsive to the one or more questions about the host. Optionally, in some embodiments, the logic when executed is further operable to cause the one or more processors to perform operations including configuring the human-like response to be a human-like avatar having one or more of a human-like text response, a human-like voice response, and a human-like video response. In some embodiments, the logic when executed is further operable to cause the one or more processors to perform operations including integrating the system over a plurality of communication platforms, where the plurality of communication platforms includes advertising platforms, voice platforms, and messaging platforms. In some embodiments, the logic when executed is further operable to cause the one or more processors to perform operations including enabling the at least one meeting participant to ask the one or more questions using natural language. In some embodiments, the logic when executed is further operable to cause the one or more processors to perform operations including enabling point and click options in the user interface for interaction options during the conversation. In some embodiments, the information responsive to the one or more questions about the host includes one or more of website links and a quick response code. In some embodiments, the logic when executed is further operable to cause the one or more processors to perform operations including utilizing a spreadsheet for processing the one or more questions about the host and for fetching information responsive to the one or more questions.

In another illustrative embodiment, the present disclosure provides a non-transitory computer-readable storage medium with program instructions thereon. When executed by the one or more processors, the instructions are operable to cause the one or more processors to perform operations including: receiving a meeting message from a host, where the meeting message initiates a meeting to be scheduled, and where the meeting message includes an invite list of at least one meeting participant; sending at least one invitation message to the at least one meeting participant, where the at least one invitation message provides meeting acceptance options; generating a human-like response in a user interface; enabling in the user interface a conversation between the human-like response and the at least one meeting participant; receiving, from the at least one meeting participant during the conversation, one or more questions about the host; and sending, to the at least one meeting participant during the conversation, information responsive to the one or more questions about the host. Optionally, in some embodiments, the instructions when executed are further operable to cause the one or more processors to perform operations including configuring the human-like response to be a human-like avatar having one or more of a human-like text response, a human-like voice response, and a human-like video response. In some embodiments, the instructions when executed are further operable to cause the one or more processors to perform operations including integrating the system over a plurality of communication platforms, where the plurality of communication platforms includes advertising platforms, voice platforms, and messaging platforms. In some embodiments, the instructions when executed are further operable to cause the one or more processors to perform operations including enabling the at least one meeting participant to ask the one or more questions using natural language. In some embodiments, the instructions when executed are further operable to cause the one or more processors to perform operations including enabling point and click options in the user interface for interaction options during the conversation. In some embodiments, the information responsive to the one or more questions about the host includes one or more of website links and a quick response code. In some embodiments, the instructions when executed are further operable to cause the one or more processors to perform operations including utilizing a spreadsheet for processing the one or more questions about the host and for fetching information responsive to the one or more questions.

In a further illustrative embodiment, the present disclosure provides a computer-implemented method that includes: receiving a meeting message from a host, where the meeting message initiates a meeting to be scheduled, and where the meeting message includes an invite list of at least one meeting participant; sending at least one invitation message to the at least one meeting participant, where the at least one invitation message provides meeting acceptance options; generating a human-like response in a user interface; enabling in the user interface a conversation between the human-like response and the at least one meeting participant; receiving, from the at least one meeting participant during the conversation, one or more questions about the host; and sending, to the at least one meeting participant during the conversation, information responsive to the one or more questions about the host. Optionally, in some embodiments, the method further includes configuring the human-like response to be a human-like avatar having one or more of a human-like text response, a human-like voice response, and a human-like video response. In some embodiments, the method further includes integrating the system over a plurality of communication platforms, where the plurality of communication platforms includes advertising platforms, voice platforms, and messaging platforms. In some embodiments, the method further includes enabling the at least one meeting participant to ask the one or more questions using natural language. In some embodiments, the method further includes enabling point and click options in the user interface for interaction options during the conversation. In some embodiments, the information responsive to the one or more questions about the host includes one or more of website links and a quick response code.

BRIEF DESCRIPTION OF THE DRAWINGS

The present disclosure is illustrated and described herein with reference to the various drawings, in which like reference numbers are used to denote like system components/method steps, as appropriate, and in which:

FIG. 39 is a block diagram of a server, which may be used in the cloud-based systems of FIGS. 37 and 38 or the like.

FIG. 40 is a block diagram of a user device, which may be used with the cloud-based systems of FIGS. 37 and 38 or the like.

DETAILED DESCRIPTION OF THE DISCLOSURE

Figure 1:
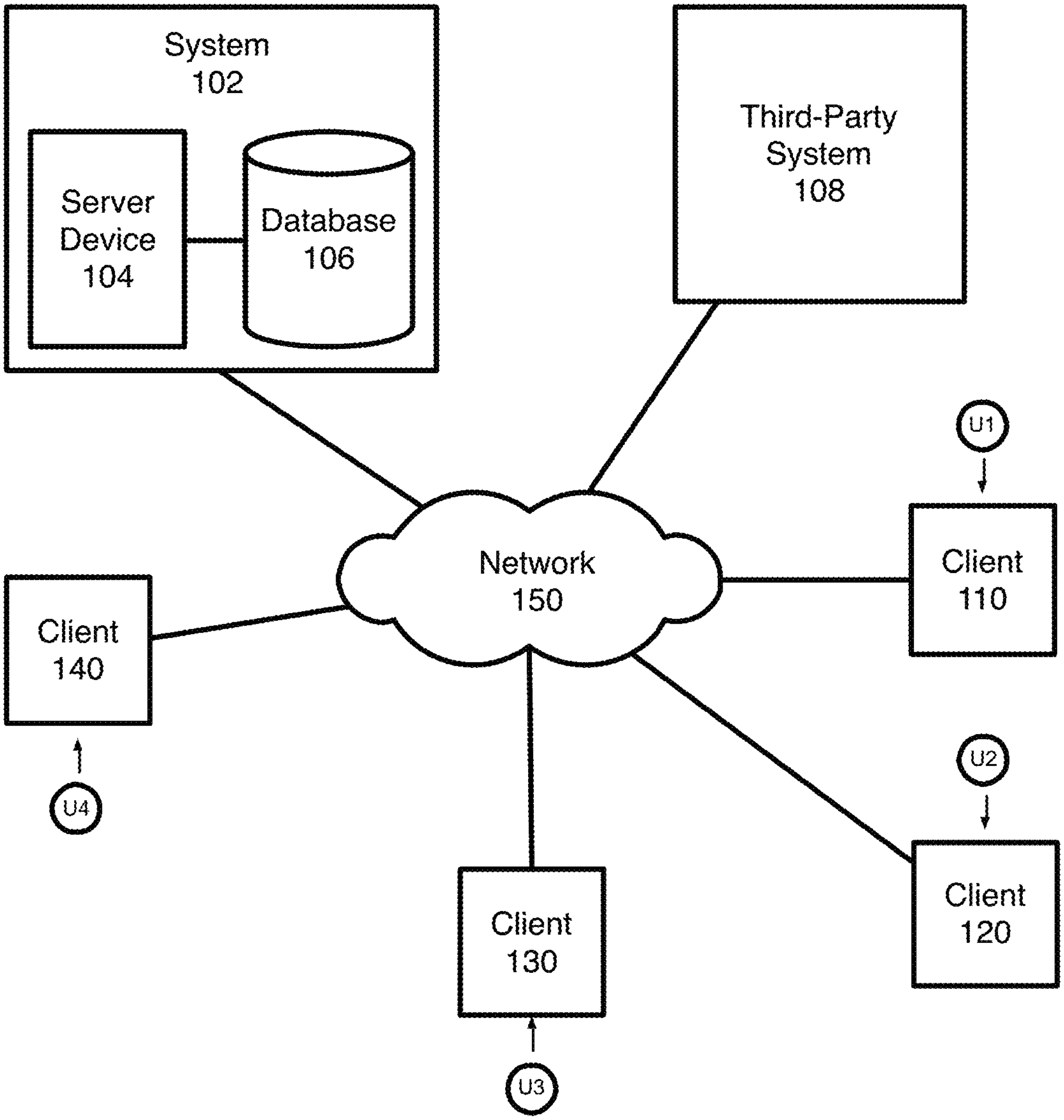
FIG. 1 is a block diagram of an example artificial intelligence agent and scheduling environment, which may be used for embodiments described herein.

The present disclosure relates to systems and methods for providing an artificial intelligence (AI) agent that provides a hybrid conversational user experience (UX) to answer questions for meeting participants and to book various types of appointments. As described in more detail herein, in various embodiments, the system mathematically generates a visual human-like avatar having a human-like voice using third party or open-source technologies. In some embodiments, the system may also clone actual people's images and voices to be used when generating avatars. In various embodiments, the human-like response represents the AI agent to meeting participants. The system utilizes voice recognition to simulate a two-way dialogue between a meeting participant and the avatar. In the various embodiments described herein, the terms system, chatbot, AI agent, AI personal assistant, personal assistant, human-like response, visual avatar, and avatar may be used interchangeably depending on the context.

As described in more detail herein, the system enables meeting participants to have a conversation with the AI agent or human-like response to ask questions about the hosts of meetings, as well as to schedule meetings. Such questions about a given host may include, for example, "Where did they go to school?", "What is their expertise on cybersecurity?", etc. based on a vectorization of documents and social media posts. For individual professionals, the AI agent of the system may function as an AI personal assistant, which may enable various functions such enabling a meeting participant to schedule a meeting, including enabling the meeting participant to select available dates and times based on multi-calendar schedule filtering. A meeting participant may, for example, provide a simple request such as "I'd like to meet 4 pm on Tuesday." The AI personal assistant may also provide a quick response (QR) code that triggers the experience on a user's personal device if viewed or shared from another device or printed QR code. The QR code may also provide links to websites in connection with responses to questions. The AI personal assistant may provide a phone number that a meeting participant may call to have an interactive voice response (IVR)-based interaction to get answers to questions and to schedule appointments. The system may also enable collection of payments for paid appointments.

For businesses integration, in various embodiments, the system may integrate the AI agent with advertisement channels or platforms such as google, meta ads, Microsoft ads, etc. The system may also integrate the AI agent with telephony messaging and voice platforms. Furthermore, the system may integrate the AI agent with messenger platforms such as WhatsApp, Facebook messenger, Instagram direct messages (DMs). In various embodiments, the system may perform vectorization of large volumes of content such as portable document formats (PDFs), JavaScript object notation (JSON) data, Microsoft Word documents in order to accurately answer questions within documents. The system may integrate the AI agent into team calendars and routing based on capabilities and availability for different services. In various embodiments, the system may generate quotes and collect payments associated with meetings and other services. The system may also integrate the AI agent with customer relationship management (CRM) systems.

In various embodiments, the AI agent replaces conventional personal assistants and/or business agents using human operators. Conventional personal assistants and/or business agents need time to process requests associated with ticket booking, orders, and other services. One request can contain many queries for some information provided on the internet. Business performance values time efficiency and needs to consider alternative ways to satisfy requests. In various embodiments, the AI agent may provide 24-hour service, which is advantageous over using a human agent. In various embodiments, the AI agent functions as a routing agent that can classify user context in conversation. As described in more detail herein, the AI agent may help with natural language processing (NLP) to analyze the request and extract some keyword information.

FIG. 1 is a block diagram of an example artificial intelligence agent scheduling environment 100, which may be used for embodiments described herein. In some embodiments, the scheduling environment 100 includes a system 102, which includes a server device 104 and a database 106. The scheduling environment 100 also includes a third-party system 108 and client devices 110, 120, 130, and 140, which may communicate with the system 102 and/or may communicate with each other directly or via the system 102. The scheduling environment 100 also includes a network 150 through which system 102, third-party system 108, and client devices 110, 120, 130, and 140 communicate. Network 150 may be any suitable communication network such as a Bluetooth network, a Wi-Fi network, the Internet, etc.

As described in more detail herein, the system 102 uses AI, machine learning, and chatbot techniques to schedule meetings for meeting participants, such as users U1, U2, U3, U4, etc. via respective client devices 110, 120, 130, and 140.

As described in more detail herein, system 102 provides a platform that enables users to efficiently and conveniently schedule events such as meetings. Such meetings may include team collaboration meetings, socializing events, etc. The system 102 enables a meeting host to create a meeting based on a range of dates and times on which each participant may be available. The system 102 utilizes AI, machine learning, and chatbot techniques, to learn and apply preferences for each participant. Using AI, machine learning, and chatbot techniques and functionality, the system enables users to choose date ranges and time ranges within which the meeting is requested to take place. Each invited attendee provides a range or ranges of dates and times in which they are available to attend the meeting.

Conventionally, business people have face-to-face or phone call conversations. In various embodiments, the AI agent of the system may provide alternative means for conversations. Compared to Gen-Xers and Baby Boomers, Millennials and Gen-Zs are generally not as fond of picking up a phone to talk and prefer sending a text, email or posting (e.g., on Slack or other communication platform). This makes sense as it is a quick and efficient means of communication. Also, one need not deal with the social awkwardness and discomfort of sitting in front of a boss or colleague. Embodiments described herein leverage this trend and provide an enhanced conversational experience to users.

In an example use case, embodiments described herein may apply to industries such as medicine, where a user may want to reschedule an appointment there is a tremendous amount of resource constraints involved. For example, a doctor, a room and equipment may all need to be available, which requires communicating with multiple third-party systems. Suppose there is a surgery where you need three people with different skills and a special room. Any rescheduling may require much geospatial triangulation, especially if the hospital system has clinics all around the country.

In another example use case, embodiments described herein may apply to a dinner reservation involving several people that are all in different time zones. At the time of booking, some of may come to the city for the dinner event. Suppose some of the people have food allergies. The system may access and parse the menu using natural language processing (NLP) to discover issues with the allergens, in addition to what times dinner is available for a party of that size. The system may also access and process flight data to determine when people are landing. The system may also coordinate any ride sharing resource such as Uber for everybody to get to the dinner. The system may also book hotels. The system may handle difficult, logistical, temporal spatial situation based on a simple email from the meeting host. For example, the meeting host may write a simple email stating, "set up dinner in New York City with Stacy, Tom, Bob, Steve, and Mary next week." Further embodiments directed to the automatic generation optimal meetings dates and times described in more detail herein.

As described in more detail herein, the system parses information related to dates, and/or times as needed for appointment scheduling. If the system already knows when a given user is free/busy, the AI agent of the system may customize appointments based on the user's availability. The AI agent has a digital presence that may put events on users' calendars (e.g., movie tickets, flight tickets, etc.). Such a presence may expand to all events and appointments.

As described in more detail herein, the system utilizes AI, machine learning, and chatbot technology to implement the AI agent. The AI agent enables users to select date ranges and time ranges for scheduling meetings and enables users to ask questions and receive response to such questions. The AI agent collects availability data from each meeting participant, utilizes AI, machine learning, and chatbot techniques to learn and apply preferences for each meeting participant, and determines an optimal date and time for a meeting to take place.

The AI agent automatically selects optimal meeting times for meetings based on the availability windows of each participant. This eliminates the need to communicate back and forth to determine a meeting time and makes it much simpler for remote and non-remote workers to meet and collaborate. As indicated herein, existing solutions help set up appointments 1-on-1 but fail to scale to teams. Embodiments describe herein work for both small and large teams and understand group dynamics of hosts and participants. The system may implement the AI agent on a web site, via email, or instant messaging platform to collect availability data from meeting participants and to communicate meeting options and details to meeting participants.

In various example embodiments described herein, the person or user initiating the scheduling of a meeting may be referred to as a user initiating the meeting, meeting initiator, the user, the meeting host, the host, the leader, and the like, depending on the context and/or scenario. These terms may be used interchangeably. The term user may be used to refer to the meeting host or an invited meeting participant, depending on the particular context. The terms meeting participant, participant, invited meeting participant, meeting participant invitee, invited attendee, and the like may be used interchangeably.

In various embodiments, the system parses text using natural language processing (NLP), where the system uses a parser to determines the syntactic structure of a text by analyzing its constituent words based on an underlying grammar. For example, the system may divide text, "Tom ate an apple" into proper noun Tom, verb ate, determiner an, noun apple. The best example is Amazon Alexa. System receives texts. The system may use NLG to generate messages for meeting participants. The system may use NLP to parse messages from meeting participants and extract data pertinent to scheduling. For example, the system may parse text in a given message to extract particular words associated with day, time, alternative days, alternative times, etc.

For ease of illustration, FIG. 1 shows one block for each of the system 102, the server device 104, the network database 106, and the third-party system 108, and shows four blocks for the client devices 110, 120, 130, and 140. The blocks 102, 104, 106, and 108 may represent multiple systems, server devices, network databases, and third-party systems. Also, there may be any number of client devices. In other embodiments, environment 100 may not have all of the components shown and/or may have other elements including other types of elements instead of, or in addition to, those shown herein.

In various embodiments, the system interacts with third-party applications to facilitate in scheduling meetings. The system connects to third party applications via application programming interfaces (APIs) to create leads, check availability, manage skills necessary for a service, process payments, get electronic signatures, etc. It acts as an assistant for a business that can service customers with as little as a single message over short message/messaging service (SMS) or social media messaging applications. Based on the meeting message, the system calculates the time and resources required and finds providers that can service the request.

A generic API is not aware of its consumers, which from the dependency standpoint is good, as it maintains security and safety of the users accessing any third-party applications. The system seamlessly integrates other applications in terms of meetings along with payment gateways to facilitate viewing of their events across different integrations. The system achieves this with minimal effort using webhooks defined by the third party or local mechanism and/or with API calls. In some embodiments, the integration may happen based on an authentication set by the specific integration. Embodiments provide a single place to make modifications and publish new API contracts, as well as a separation of concerns. In some embodiments, multiple clients may suffer because of too many API calls to fulfill their UI requirements. The system may mitigate this by using webhooks to retrieve updated information.

In various embodiments, the system has a provision for users to book and pay for an appointment at the same time. This aims to facilitate payments and having a single point of contact for the user as well as the provider (e.g., doctors that are part of a clinic or organization). The system complies with all security measures required by third party payment integration, and the system functions as a facilitator to reach the payment gateway set up by the provider. In various embodiments, the system may use a generic API to integrate multiple payment providers seamlessly with less to no modifications to the actual API.

In some implementations, the system may employ a subscription model, where the system enables users to subscribe to a paid model of an application associated with system. The subscription includes support for users to create their own internal flows and teams. The system may also provide a free plan, where users can connect their own calendars and create personal meetings. Subscribed user will have priority access to newer features.

While the system 102 performs embodiments described herein, in other embodiments, any suitable component or combination of components associated with the system 102 or any suitable processor or processors associated with the system 102 may facilitate performing the embodiments described herein. For example, the system 102 may utilize AI, machine learning, chatbot techniques, etc., and any combination thereof to schedule meetings for meeting participants. Various example embodiments directed to the system 102 utilizing AI, machine learning, chatbot techniques are described in more detail herein.

In various embodiments, the system utilizes chatbot techniques to generate the AI agent that interacts with meeting participants, including providing meeting details and collecting availability data from participants. Chatbots and thus the AI agent may mimic human behavior to a certain extent. This can be leveraged to reduce human intervention required to interact with users for a set of well-defined actions or a flow. In various embodiments, an AI agent parses a prompt provided by users using NLP models, and then determines the respective action which needs to be taken such as scheduling, updating, deleting an appointment or creating, deleting a shift, etc., for example. Example messages from a meeting participant may include phrases such as, "I need to move my Friday shift to Saturday," I can't work tomorrow," "I need to be an hour late to my botox," "I want a men's haircut Tuesday before noon," "I need an MRI for my neck and head," "My glass broke on my 2010 infiniti g37," Can we fix it today?"

In some implementations, a meeting host may also receive details of the meeting if an option is set to include them as guests. This facilitates the host to communicate with the AI agent user if human intervention is required at any stage. The system may provide required permissions to view, and update calendar events with respect to the calendars of users. It is important to note that a user need not be a member user in order to join a meeting. Embodiments described herein provide functionality that reduces the time taken to schedule regular or occasional events without any miscommunication or human error. At the same time, administrators can be well informed about events on their calendar at a central location instead of jumping between applications. The system uses the AI agent to enable the use of simple text messages to perform complex operations.

Figure 2:
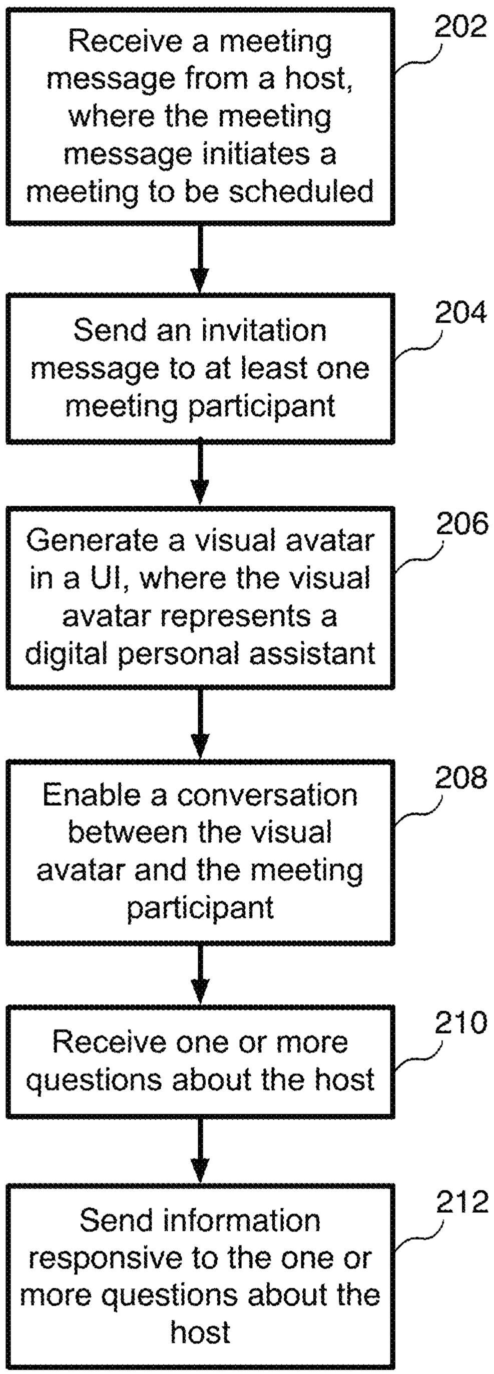
FIG. 2 is an example flow diagram for providing an artificial intelligence agent, according to some embodiments.

In various embodiments, the system provides electronic signature services. Electronic signatures provide means for parties involved in enforcing a document to provide their consent for reaching a mutual agreement or terms of service. An increased usage of e-signing of documents have replaced the traditional physical paper route due to parties being in different locations. In various embodiments, electronic signatures may be processed in two general stages. First, the party creating the document e-signs the document and sends it to the other party. Then, the other party vets the document and then e-signs it, indicating a mutual consent by both parties that they agree to uphold the terms of agreement. If any dispute arises between the parties at a later stage or for any claims, the e-signed document becomes the source of truth. Neither party can claim that they have not given consent to the terms after signing the document. The document or agreement may be updated after execution of the initial e-sign, upon agreement by both parties. There may be scenarios, where there are more than two parties involved in the process of e-signing a document. At any stage, the chain of custody is specific and visible to all parties FIG. 2 is an example flow diagram for providing an AI agent, according to some embodiments. As described in more detail herein, embodiments facilitate scheduling meetings and enabling conversations between a human-like response and a meeting participant, where the human-like response may function as a personal assistant or business agent. In various embodiments, the AI agent may serve various functions. For example, the AI agent may be used for an individual on a small team. In another example, the AI agent may be used for a business in connection with revenue generating activities. Such revenue generating activities may be associated with sales development representatives (SDR), and/or sales agent, and/or customer service agent, etc., including pre-sales support and sales support. In various embodiments, the AI agent may be used for outbound capabilities, including voice calls, and/or text messages, and/or advertisements for acquiring new clients.

Referring to both FIGS. 1 and 2, a method is initiated at block 202, where a system such as system 102 receives a meeting message from a host. In various embodiments, the meeting message initiates a meeting to be scheduled, where the meeting message includes an invite list of at least one meeting participant. For ease of illustration, some embodiments are described herein in the context of one meeting participant and the host. These embodiments also apply to multiple participants and the host.

At block 204, the system sends an invitation message to at least one meeting participant. In various embodiments, the invitation message provides meeting acceptance options.

At block 206, the system generates a human-like response in a UI. In various embodiments, the human-like response may represent a digital personal assistant and/or a digital business agent. An example human-like response is described in detail below in connection with FIG. 3, for example.

Figure 3:
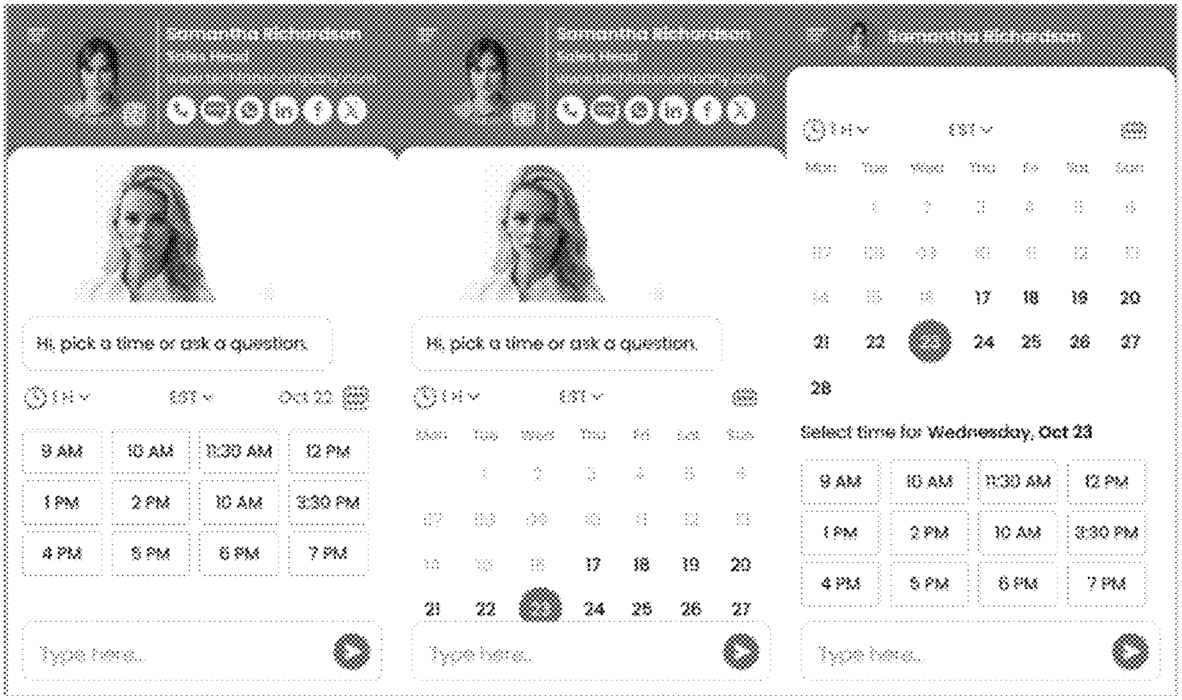
FIGS. 3-4 shows example screenshots on a user device showing a conversation between a visual avatar and a meeting participant on the application of the present disclosure.

FIG. 3 shows example screenshots on a user device showing a conversation between a visual avatar and a meeting participant on the application of the present disclosure. In various embodiments, the system configures the human-like response to be a human-like avatar having one or more of a human-like text response, a human-like voice response, and a human-like video response. For example, FIG. 3 shows a visual avatar that converses with a meeting participant user. In the example shown, the avatar may ask the meeting participant to pick a time or ask a question. The system may provide time slots and calendar date for the meeting participant to select.

In various embodiments, the system integrates the AI agent over a plurality of communication platforms. In various embodiments, the communication platforms may include advertising platforms, voice platforms, and messaging platforms. In various embodiments, the system provides support for various different business platforms. Such business platforms may include hiring, insurance, recruitment platforms, etc.

At block 208 of FIG. 2, the system enables in the user interface a conversation between the human-like response and the meeting participant. An example conversation is described in detail below in connection with FIGS. 4 and 5, for example.

Figure 4:
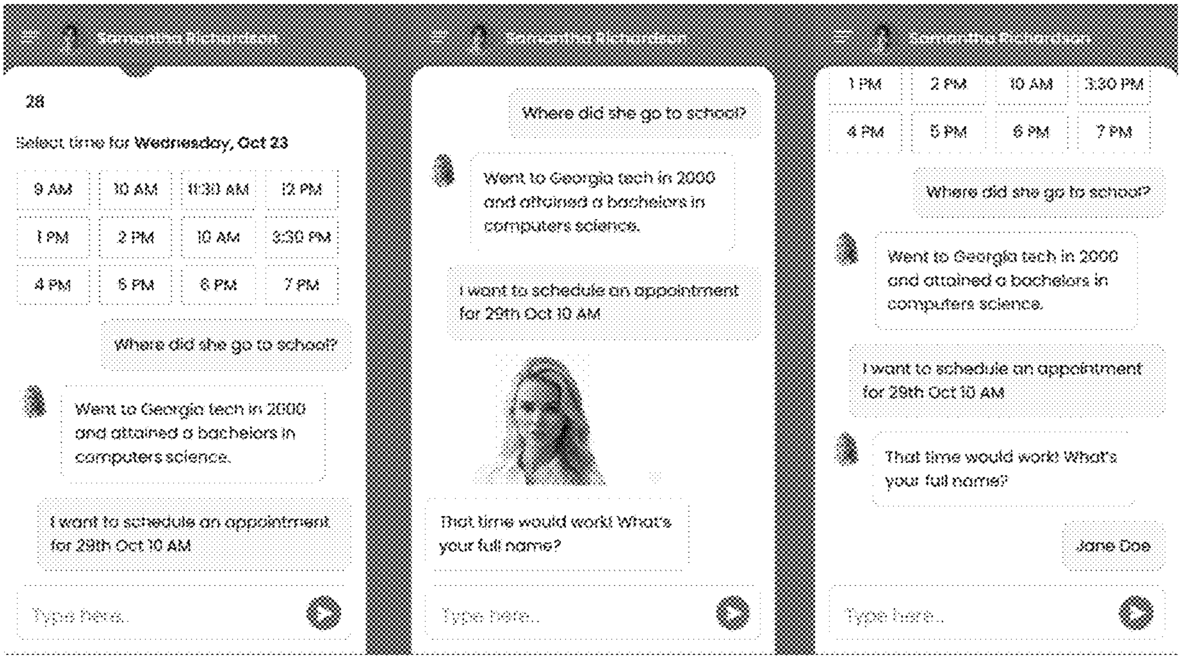

FIG. 4 shows example screenshots on a user device showing a continued conversation between a visual avatar and a meeting participant on the application of the present disclosure. In various embodiments, the system enables the meeting participant to ask the one or more questions using natural language. For example, shown is an example question posed by the meeting participant (e.g., "Where did she go to school?), as well as an example preference made by the meeting participant (e.g., "I want to schedule an appointment for $29^{th}$ October 10 AM.").

At block 210 of FIG. 2, the system receives, from the meeting participant during the conversation, one or more questions about the host. In various embodiments, the system receives such questions via the AI agent.

At block 212, the system sends, to the meeting participant during the conversation, information responsive to the one or more questions about the host. Such information may include responses to questions, which may include informational resources such as links to websites and/or other associated information. An ongoing example conversation is described in more detail below in connection with FIG. 5, for example.

Figure 5:
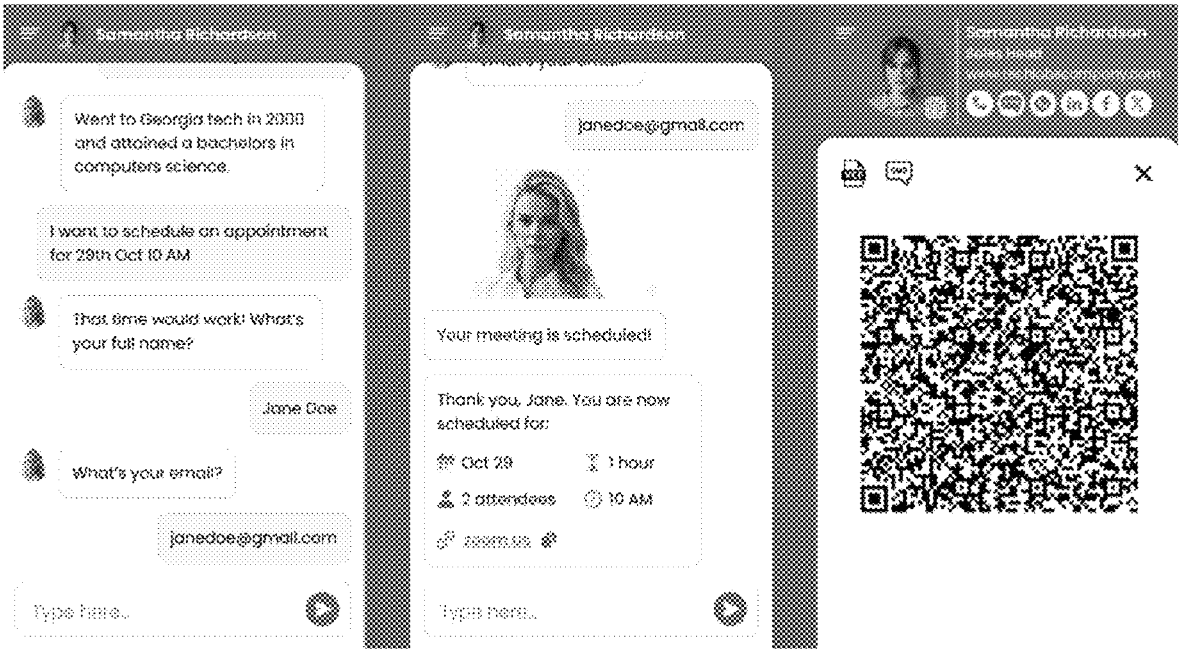
FIG. 5 shows example screenshots on a user device showing a continued conversation between a visual avatar and a meeting participant, and a quick response code on the application of the present disclosure.

FIG. 5 shows example screenshots on a user device showing a continued conversation between a visual avatar and a meeting participant, and a quick response (QR) code on the application of the present disclosure. Shown is an ongoing conversation between the meeting participant and the avatar. In various embodiments, the system enables point and click options in the user interface for interaction options during the conversation. For example, shown in FIGS. 3, 4, and 5 are various buttons that the meeting participant to select for engaging in a conversation with the avatar as well as for setting up a meeting.

In various embodiments, the information responsive to the one or more questions about the host may include one or more of website links and a QR code. Also shown in FIG. 5 is a QR code that the meeting participant may scan to access additional information. Such additional information may include websites and other information such as company information and/or information about the host (e.g., business profile, etc.). In various embodiments, the system may utilize factorization of websites and content to generate the conversation experience automatically without any need to create a decision tree by hand.

The system may receive input data associated with the meeting acceptance options; compute an optimal meeting date and time based on the input data associated with the meeting acceptance option; and schedule the meeting based on the optimal meeting date and time. In various embodiments, the system may perform omni-channel communication integration. For example, the system may utilize an API designed to seamlessly integrate with multiple communication channels such as SMS and WhatsApp, etc. Such integration enables the API to capture responses from users across different platforms, providing a unified approach to response collection.

In various embodiments, the system collects and store of responses to questions from meet participants. For example, once the user responses are captured through the omni-channel platforms, the system API facilitates their transfer to a designated third-party system. This can include cloud-based spreadsheets or other data management systems specified by the end-user. The process may involve the API sending the collected responses to the third-party system using secure data transfer protocols. The system ensures data integrity and accuracy in the storage of these responses.

In various embodiments, the system performs file upload and URL storage. For example, in addition to text responses, the system is capable of handling file uploads from users. When a file is uploaded through a communication channel, the system API transfers it to a specified object storage system. The system then generates a direct URL to the stored file and stores the direct URL as a part of the user's response data.

In various embodiments, the system utilizes a spreadsheet for processing the one or more questions about the host and for fetching information responsive to the one or more questions. As described in more detail herein, the system may utilize the spreadsheet for various different functions associated with the AI agent. Example embodiments directed to a spreadsheet of the system are described in more detail below, in connection with FIG. 6.

Figure 6:
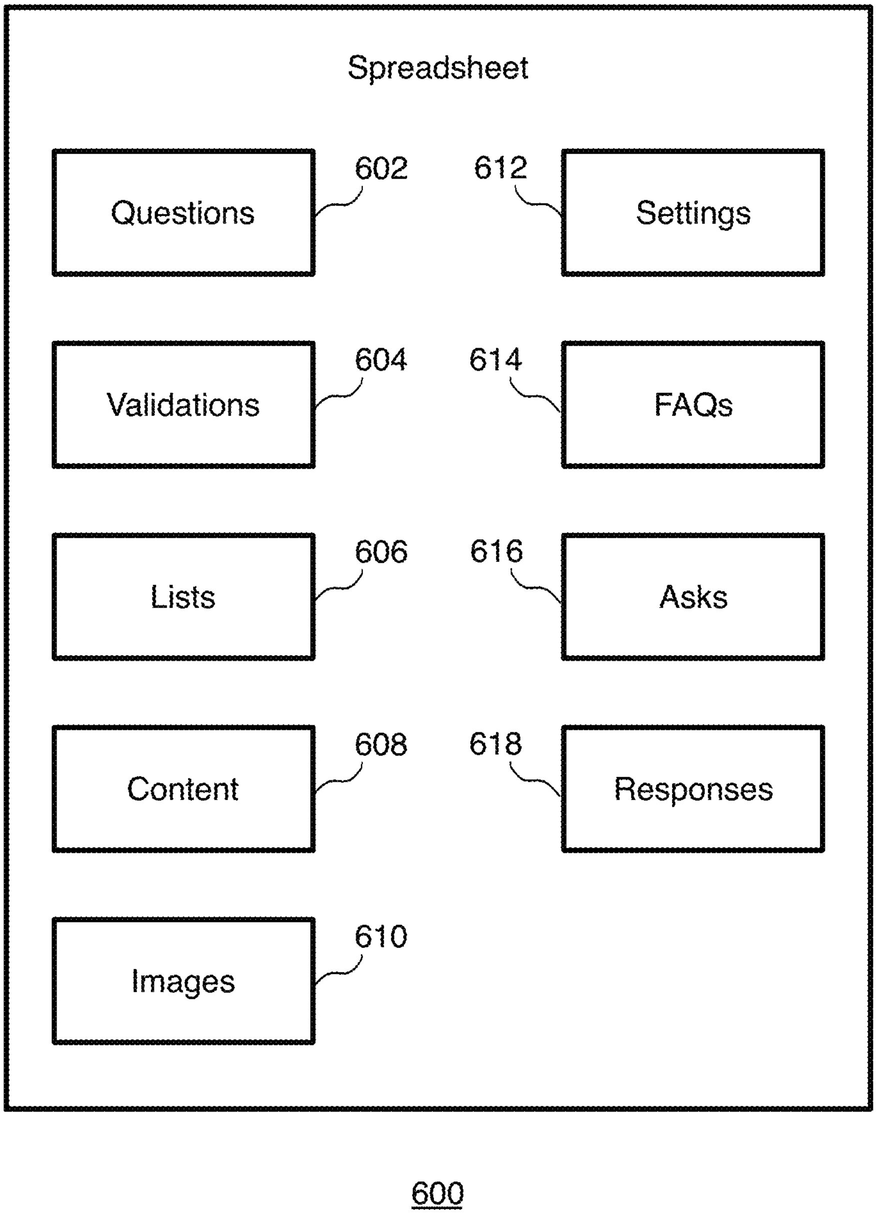
FIG. 6 shows an example spreadsheet associated with an artificial intelligence agent on the application of the present disclosure.

FIG. 6 shows an example spreadsheet 600 associated with an AI agent on the application of the present disclosure. In various embodiments the spreadsheet 600 includes various tabs that serve different functions associated with the AI agent. Shown are a questions tab 602, a validations tab 604, a lists tab 606, a content tab 608, an images tab 610, a settings tab 612, a frequently asked questions (FAQs) tab 614, an asks tab 616, and a response tab 618. Other embodiments of the spreadsheet 600 may not have all of the types of tabs shown and/or may have other types of tabs instead of, or in addition to, those shown and discussed herein.

To build the AI agent, the system may utilize a spreadsheet such as the spreadsheet 600 to structure questions posed to or by meeting participants and corresponding responses, as well as other information. The system may also utilize a spreadsheet such as the spreadsheet 600 to perform various operations described below.

In various embodiments, the questions tab 602 may function to store script questions posed to and by the user. The questions tab 602 may have various columns associated with text, variables, types, conditions, etc. For example, a text column may add a message. A variables column may store responses. A type column may define a question type. A condition column may store messages that match particular conditions. Different built-in types in the type column may be used for validations and specifying question types. The questions tab 602 may also specify lists, services, subservices, prepaid services, and more. A syntax "{variable_name}" may enable the system to use previous variable values in subsequent questions. Additionally, the questions tab 602 may also support a jump feature, enabling the flow to move to a specific question if the user types a matching word.

In various embodiments, the validations tab 604 may function to add validations to user responses. Variables are specified, and validations are added accordingly. The lists tab 606 functions to specify lists, services, sub-services, and prepaid services using names. The same name may be added to a type section of the "Questions" tab (i.e., "#list_variable_name") to apply the list to a particular question. The content tab 608 functions to specify website links and document links for vectorization. For example, when a user asks a question, the AI agent may include information associated with the content tab 608 when providing a response. The images tab 610 functions to provide images to the AI agent. Image names and URLs are specified, and the syntax "(image_name.ext)" is used to incorporate images into questions and/or responses.

In various embodiments, the settings tab 612 may function to define settings of the AI agent. Such settings may be associated with aspects such as icon, title, background, text, color, mode of meeting, bot description, etc. For videos, the AI agent may be represented by a human-like response that uses default voices and images (e.g., Alice, Frank, etc.). Customized voices, video avatars, and video avatar cards may also be specified. If payments are involved in any interactions or transactions with the system, identifiers (IDs) for payment processing platforms (e.g., Stripe, etc.) may also be provided at the settings tab 612.

In various embodiments, the FAQs tab 614 may function to store frequently asked questions along with their corresponding responses. The asks tab 616 may function to store questions asked by the user and/or to store information or links to sources of responses (e.g., openAI, vectorize data, etc.), as well as information (e.g., timestamps, etc.) for analytical purposes. The response tab 618 functions to store user responses using variable names.

In various embodiments, a user may enter data such as availability information, availability preferences, requests, etc. in fields of user interface associated with the system, or by other means such as a spreadsheet. The spread sheet 600 may facilitate in answering questions based on reading contextual inputs. The system provides a no-code solution for the various use cases described herein. For example, in various embodiments, a user can enter information into the system in the form of an electronic message such as an email, and the system takes care of the rest. For example, the data my include availability data, including availability preferences, as well as any questions or request in association with the host of the meeting or in association with scheduling a meeting. The system may convert phrases in a request or question in a given email or in a conversation between the user and an avatar of the AI agent into a JSON configuration file. The file may then be consumed by the system's APIs to trigger different flows as inputs to the entire system. The system may integrate such flows with various communication platforms such as instant messaging platforms (e.g., WhatsApp, etc.) for example.

In some embodiments, the system enables a user to provide a number issued by a platform (e.g., Twilio), set up a messaging account (e.g., WhatsApp business account, etc.), and sign up with the system. The system may utilize a message template to enable a user to start a business-initiated conversation with messaging platforms (e.g., WhatsApp, etc.). Such conversations may include customer care messages or appointment reminders, payment or shipping updates, alerts, etc. For example, a message may be, "You made a purchase for {{1} } using a credit card ending in {{2} }," where {{1} } and {{2}} are placeholders. The particular template may vary, depending on the particular communication platform.

In various embodiments, transformers translate text and speech in near real-time, opening meetings and classrooms to diverse and hearing-impaired attendees. All the conversations from the user are subject to a transformer model. A transformer model is a neural network that learns context and thus meaning by tracking relationships in sequential data like the words in this sentence. Transformer models apply an evolving set of mathematical techniques, called attention or self-attention, to detect subtle ways even distant data elements in a series influence and depend on each other. First described by Google, transformers are among the newest and one of the most powerful classes of models invented to date. They are driving a wave of advances in machine learning some have dubbed transformer AI. Stanford researchers called transformers "foundation models" because they see them driving a paradigm shift in AI. The "sheer scale and scope of foundation models over the last few years have stretched our imagination of what is possible," they wrote.

Before transformers arrived, users had to train neural networks with large, labeled datasets that were costly and time-consuming to produce. By finding patterns between elements mathematically, transformers eliminate that need, making available the trillions of images and petabytes of text data on the web and in corporate databases. In addition, the math that transformers use lends itself to parallel processing, so these models can run fast. Like most neural networks, transformer models are basically large encoder/decoder blocks that process data. Small but strategic additions to these blocks (shown in the diagram below) make transformers uniquely powerful.

In various embodiments, the system utilizes a transformer model to answer various types of input. The transformer model is trained to produce various types of results. For example, such results may include the current date (e.g., Nov. 17, 2022). A natural language sentence such as "Let's meet tomorrow at 4 PM" may result in a string such as "data": {"start":"2022-11-18T16:00:00Z", "end": "2022-11-18T17:00:00.000Z"}. In another example, a natural language such as "Let's meet next Monday would produce" may result in a string such as "data": {"start": "2022-11-21T00:00:00Z", "end": "2022-11-21T23:59:59Z"}. In various embodiments, the transformer model assists the system in parsing date and time information that are needed for scheduling user requests. The processing related to user queries may be performed on edge networks.

In some scenarios, a user may abruptly stop the conversation in the middle, and that has to be managed, so that next time the user can resume from the same state. This is called persisting the state of conversation. After each query, the state of the conversation is saved in-memory at the edge networks itself. Saving in memory bring down the latency, and improve the response time of the system overall.

As the conversation continues, in accordance with the spreadsheet, the system stores the answers in-memory and keeps working on creating payload for internal APIs. Scheduling is supported to the times, when the host is available. In the configuration, the host can choose to book itself with as many people as the system can, or the host can also choose to book itself with one at a time basis, or soft-book itself with people, and approve the meetings himself.

When a conversation reaches the state where the user can tell when it wants to schedule appointment, the system generally asks for the suitable date. The control to choose the date is given to the user. However, the time on the selected day needs to be checked by the system to find the available time of the host. In other words, the control to select the date, and then time at which the host is available makes the system flawless. This involves fetching of all the events, in all the calendars of respective user—these are called blocks. The system also checks for the working hours of the host—this is called general availability. General availability corresponds to host's working hours and it can be configured with the user. The purpose of general availability is straightforward—to schedule all the appointments during the working hours. Doing this processing on the fly makes is expected to take time because it has to go through all the calendars. The system determines the general availability of the requested day, and finally calculate the availability blocks. Since this is conversational experience, the system is fast—fast enough to respond to each request within milliseconds. Otherwise, it loses its significance. To achieve that, in some implementations, the system may utilize Amazon S3 as a caching layer for the system. For each user, there exists an S3 file, which contains all the necessary information in structured JSON. After getting all necessary details from S3 file of the host, the system may process the dates and times at which the appointment can be scheduled. Depending upon the answers, a payload is created, which is fed to meeting creation APIs. The system may convert any response into a suitable format depending upon the platform (e.g., instant messaging platform such as via Twilio in case of WhatsApp, etc.).

Embodiments described herein bring a conversational experience for users and businesses to streamline, and to provide better scheduling experience. Its simplicity makes it so easier, and one-stop for managing all the calendars that a user has. It can be realized in numerous use cases to make scheduling hassle free.

The following are example use cases in which the system may schedule events based on different scenarios. In a simple 1-on-1 use case example, a user 1 (host) emails user 2 with CC: application.xyz with the body of the email "Let's meet tomorrow." Both of the users are in the system, which sends user 1 a confirmation email for a 10:00 a.m. meeting the next day. User 1 has the option to select alternative times, click accept, or do nothing. The system auto-confirms after an hour and the meeting is scheduled.

In an email-to-event use case example, a user 1 (host) sends an email to user 2 and user 3 (meeting participants) with CC: application.xyz. The system detects who is an existing user and who is new. The system asks new users to register and connect their calendars. The system finds all optimal times and recommends the soonest time that works for everyone. User 1 confirms the first recommended time and invites get sent to everyone. In some embodiments, the system may automatically schedule the meeting if users 2 and/or 3 do not confirm or select an alternative time.

In an inbound use case example, an unknown customer sends in an email asking, "What's the pricing." Suppose a company has 3 salespeople, 3 support people and 3 general people. The system understands what team everyone is on, and that pricing is a sales keyword. The system looks at all 3 users calendars and responds to the user with a clickable calendar. The user clicks a date and gets taken to a browser to show times for that date. The customer clicks a specific time and is scheduled with a salesperson that was available at that time.

In another inbound use case example involving an application user. A known application user emails support@company.com that also uses the system asking to meet on Tuesday. The system notices "Tuesday" and checks the support teams calendars as well as the user's calendar and automatically books a time that works for both sides. The email confirmation has a reschedule button in case this was not an ideal time for anyone.

In a double teams with optional people use case example, a user 1, the leader of a team, has 7 people on this team and 5 people at the client's team meet. Not everyone is required. User 1 team is already on the application, but the client is not. User 1 creates a meeting using "Create Meeting" option from their mobile phone and enters the client's emails as well as their teams. User 1 marks some people as required and some as optional. The system sends emails to non-users to get their calendars. Once all required users are setup, all potential dates and times are calculated. Host receives recommendations, and decides not to select the nearest time, and choses from a list of options that work for everyone. The system shows that certain times will not work for some of the options.

In a website bot use case example, the system utilizes an integrated bot in a website. The bot shows up and invites a user to ask a question. The user asks "how do I do xyz" and the system classifies that as a support question. The bot responds, "When are you available for a support call" and the user selects a time. The times only show available times when anyone in the support team is available. A meeting is scheduled with an available support representative.

In a simple event use case example, user 1 asks User 2 and User 3, "Pizza for dinner tomorrow 7:00 p.m." They are all in the system, and even though this is outside business hours, everyone is available. The system sends out an invite on everyone's calendar.

In a tread to meeting use case example, three users are discussing a technical topic and realize it makes sense to setup a meeting. They add CC: application.xyz on the last reply and add "Jump on a meeting at 10:00 a.m.? " Everyone is in different time zones and the system assumes eastern standard time (EST) based on the time zone of the user that asked the question. If one of the three users is not in the system, the user may receive an email saying "We are about to schedule the meeting for 10:00 a.m. EST tomorrow. Please confirm if this works for you. If we don't hear in the next 60 minutes, it will be scheduled." If the third person does nothing, and the meeting is scheduled.

In a double booked use case example, a host sends an email to one participant suggesting "Let's meet at 4:00 p.m." Host does not realize they already have a 4:00 p.m. meeting. The host receives an email notifying them about the conflict and has the option to confirm the meeting, do nothing (auto confirms after a set period of time), or is given additional options that work for both parties.

In an interview use case example, a team lead has to interview 10 people individually. System coordinates schedules to maximize number of candidates that can be interviewed.

In a mass interview use case example, existing 5-person team wants to interview 25 candidates. Candidates that pass the first interview should be interviewed by a second person (ideally team lead). System coordinates schedules to maximize number of interviews.

In a matchmaker use case example, a matchmaker needs to match 100 users with 100 other users for 1-on-1 meetings. The system provides the matchmaker with lists of times and dates that work for pairs of users. The matchmaker can select form the potential options.

In a friends gathering use case example, a host wants to have a meeting with 20 friends on any weekend evening. The system recommends meeting some friends on Friday and some on Sunday to maximize the number of people that can attend.

In an advertisement driven user acquisition use case example, a yoga instructor Stacy sees a "calendar tennis" advertisement and relates to the struggle of going back and forth with clients. She signs up for rund.ai and starts scheduling her private zoom classes. She sends out her rund.ai/Stacy yoga link on her next outreach In a viral rapid onboarding use case example, Mark, VP of HR for Shield Insurance sets up a time with Stacy. He rapidly onboards with his Gmail account and books an appointment with Stacy. He sees that he can use "rund.ai/markshield" and tries it. The process is so easy that he uses it for internal meetings with this team and they all sign up In a formal team creation use case example, Mark creates the "HR" team with link "rund.ai/shield/HR" for his team and sends this out to all employees to make it easier for them to schedule with HR. Mark wants to start using this for external candidates In a flow creation use case example, Mark creates a google spreadsheet with their typical screening questions. Mark also provides links to the company web site, employee handbook and benefits package. He sees that the system can be used to schedule candidates via WhatsApp and also screen them. He uses the system to give his team a WhatsApp number and access to create flows. Mark creates a flow with his google sheet. Mark enters a few candidates into the system and the URL of a job posting they have.

In an inbound web candidate intake use case example, rund.ai/shield/HR&flow-apply is setup as an application link for inbound candidates. The link shows the availability of the HR team collectively. Appointments are balanced across the team fairly. Candidate can select a time, quick signup with google. The time selection then morphs into a chatbot or AI agent flow In an outbound IM candidate intake use case example, candidates get the WhatsApp and respond with screening questions and upload their resume. Candidates can ask questions about the company as well. Candidates select a time slot which gets "soft booked."

In an approval use case example, the system determines the fit for a job (low/medium/high) based on the resume and job description using advanced NLU. Mark sees and email forever applicant with a predicted fit, their responses and the chat history. He clicks accept on the better candidates. The soft bookings get hard booked and get added to candidate's calendar. Mark ignores the bad ones. In one case mark reschedules to another time. FIG. 7 through FIG. 11 show example process flows that the system may use to implement the AI agent as well as use cases described herein.

Figure 7:
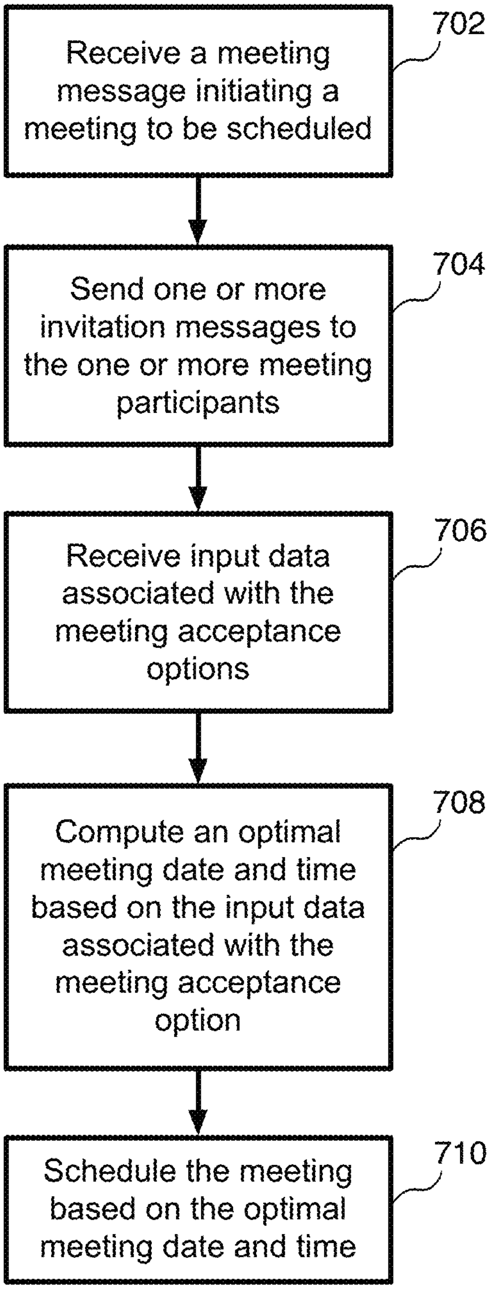
FIG. 7 is an example flow diagram for scheduling meetings, according to some embodiments.

FIG. 7 is an example flow diagram for scheduling meetings, according to some embodiments. Referring to both FIGS. 1 and 7, a method is initiated at block 702, where a system such as system 102 receives a meeting message. This meeting message may be referred to as a meeting initiation message, as it initiates a meeting to be scheduled. In various embodiments, the meeting message includes an invite list of one or more meeting participants. The meeting message also includes an initial meeting date and time. In various embodiments, the meeting message is an electronic message. For example, in various embodiments, the meeting message may be an email message or a text message.

At block 704, the system sends one or more invitation messages to the one or more meeting participants, respectively. As described in more detail herein, the one or more invitation messages provide meeting acceptance options. For example, in various embodiments, the meeting acceptance options may include an option of accepting a date and time indicated in the one or more invitation messages and an option of proposing an alternative date and time.

At block 706, the system receives input data associated with the meeting acceptance options. In various embodiments, the input data includes response messages from the respective one or more meeting participants. In various embodiments, the input data may be received in the form of electronic messages from the meeting participants. For example, in various embodiments, the input data may be received in the form of email messages and/or text messages. The input data may include information associated with the meeting acceptance options. For example, the input data associated with a given participant may include an acceptance of the date and time that is indicated in the invitation message. Alternatively, the input data associated with a given participant may include a proposal of an alternative date and time.

At block 708, the system computes an optimal meeting date and time based on the input data associated with the meeting acceptance option. In various embodiments, the computing of the optimal meeting date and time is performed using AI. The system may perform any needed AI techniques and functionality and/or may cause another system to perform AI techniques and functionality. The system may obtain any resulting AI data from any suitable database such as database 106 of FIG. 1 or from the other system as needed.

In various embodiments, the computing of the optimal meeting date and time is performed using an AI chat bot. The system may perform any needed AI chatbot techniques and functionality and/or may cause another system to perform AI chatbot techniques and functionality associated with the AI agent. The system may obtain any resulting data associated with AI agent interactions with users via their respective clients from any suitable database such as database 106 of FIG. 1 or the other system as needed.

In various embodiments, the computing of an optimal meeting date and time is based on one or more meeting policies. The system may access such meeting policies from any suitable database such as database 106 of FIG. 1. An example meeting policy may be for the system to enable the meeting host to request availability from meeting participants, where the system determines an optimal meeting time based on availability data from all participants. Another meeting policy example may be for the system to collect availability data from a subset of meeting participants, such as employees of an organization as opposed to optional non-member guests. Another meeting policy example may be for the system to enable at least a subset of meeting participants or all meeting participants to provide alternative dates and times for a given meeting. Various policies and associated features are described in more detail herein.

At block 710, the system schedules the meeting based on the optimal meeting date and time. The system then sends out the meeting message to all meeting participants, including the meeting host.

In association with a meeting, the system sends emails directly to meeting invitees informing them about scheduled appointments or shifts. In addition to this, the system also provides soft booking, meeting or event details will not reach the user until it is approved by the person with whom the meeting is scheduled. The latter person (e.g., a doctor, shift manager, etc.) will have the flexibility of rescheduling an appointment and then approving or rejecting the same.

In various embodiments, the system enables multiple bookings. For example, an experienced doctor user may need to be available for multiple appointments at the same time. The system supports this by enabling multiple time slots to be scheduled, which may be based on a configuration of a specific role of the doctor and appointment count. For example, a specialist doctor may be available for 3 sessions at the same time for requested role and count remotely for requested consults.

Although the steps, operations, or computations may be presented in a specific order, the order may be changed in particular embodiments. Other orderings of the steps are possible, depending on the particular embodiment. In some particular embodiments, multiple steps shown as sequential in this specification may be performed at the same time. Also, some embodiments may not have all of the steps shown and/or may have other steps instead of, or in addition to, those shown herein.

Figure 8:
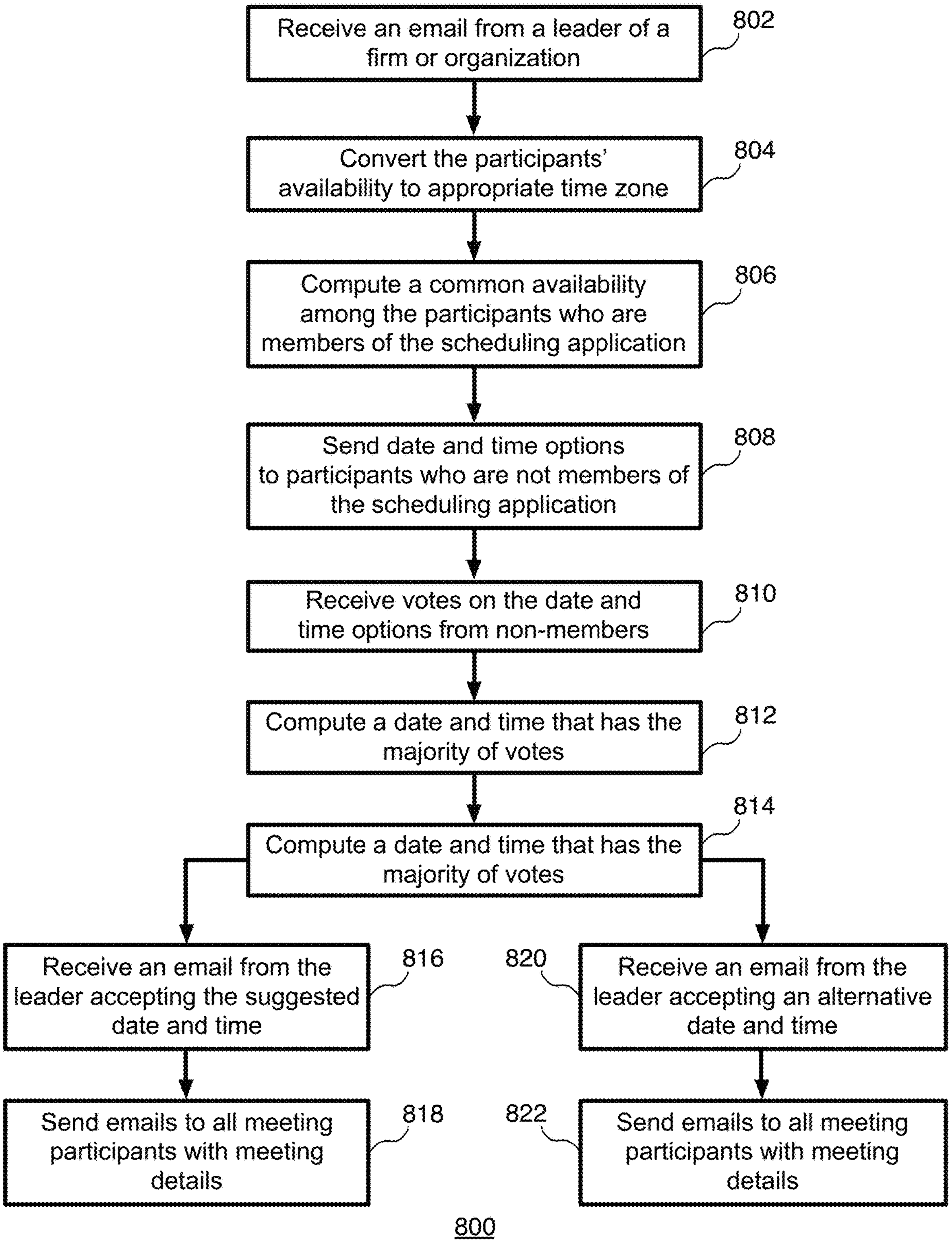
FIG. 8 is an example flow diagram showing a use case for scheduling meetings, according to some embodiments.

FIG. 8 is an example flow diagram showing a use case for scheduling meetings, according to some embodiments. Referring to both FIGS. 1 and 8, a method is initiated at block 802, the system receives a meeting message in the form an email from a leader of a firm or organization. In this example use case or scenario, the leader emails 80 required participants and copies (CCs) 20 optional meeting participants an invitation to a meeting. The leader wants to create a company-wide meeting with 80 required employees and 20 optional stakeholders for the "first week of April" to go over the first quarter performance. The leader crafts the email to the 100 people putting employees in the TO and optional stakeholders in the CC for the email. In this example, there are 10 employees who are required meeting participants, and there are 10 stakeholders who are not members of the scheduling application and who are optional meeting participants. The leader may mention an interest in scheduling the meeting for the first week of April.

At block 804, the system converts the participants' availability to an appropriate time zone. In some cases, where the meeting participants are in different time zones, the system converts all times to the same time zone.

At block 806, the system computes a common availability among the meeting participants who are members of the scheduling application. A member of the scheduling application may be, for example, a meeting participant who employed by the same organization as the meeting host. In various embodiments, users my register with the scheduling application via the system to become a member. As a member, the user may provide in a user profile general availability and/or availability preferences such as days, dates, times, as well as day ranges, date ranges, and time ranges. The system may utilize AI and machine learning use such profile availability data for computing optimal meeting times. The system utilizes the AI agent to communicate and coordinate with meeting participants to collect other availability data for the system to process when computing optimal meeting times. Further example embodiments directed to user profiles are described in more detail herein. The system prepares a list of permutations of all available time slots. The system may maximize general availability hours while using "awake" hours as a last resort and weights the results to business hours to a single time zone even though there are participants all over the world.

At block 808, the system sends date and time options to meeting participants who are not members of the scheduling application. The system sends to the non-members a list of several potential date and time options that work for the members.

At block 810, the system receives votes on the date and time options from the non-members. In various embodiments, the system enables meeting participants to vote on an optimal meeting date and time. For example, suppose that half the non-member meeting participants (e.g., 5 employees) select between 1 and 10 meeting date and time options. The remaining non-member meeting participants (e.g., 5 stakeholders) ignore the emails essentially giving up their chance to vote. The times with the most votes are ranked based on how well they fit into the general availability and free slots of the entire group of members. At block 812, the system computes a date and time that has the majority of votes.

Alternatively, each member may select different time options. In this case, the system may give priority to participants who are required to attend the meeting, or select the earliest time if no option gets the majority vote. Further, if the leader fails to select a meeting time in a given time, the system will automatically choose the best time with the given options.

At block 814, the system sends an email to the leader suggesting a date and time. The email includes the date and time chosen by the majority of meeting participants, and may include multiple alternative time options. For example, the leader may receive an email suggesting that Wednesday at 10:00 a.m. is the best option, and Thursday at 11:00 a.m. and Friday at 12:00 p.m. that are alternatives.

At block 816, the system receives an email from the leader accepting the suggested date and time. The leader choses one of the provided times and sends a link with the meeting description.

At block 818, the system sends emails to all meeting participants meeting details. The emails include a confirmed meeting date and time.

At block 820, the system receives an email from the leader accepting an alternative date and time. The email indicates that the leader agrees with the suggested date and time and provides a meeting link.

At block 822, the system sends emails to all meeting participants meeting details. All meeting participants individually receive a calendar invite with the time and link details. The emails include the confirmed meeting date and time, and any other pertinent meeting details. The system sends out such emails after the meeting host or leader agrees with the suggested date and time and provides a meeting link.

The present application is adapted to scale at low cost to millions of users. Front-end development and interaction can utilize solutions such as S3 Web Hosting, Next.js (React), and others of the like, while back-end development can utilize any of API Gateway, AWS Lamda SAM CLI (serverless), Aurora Serverless v1 DB, and others of the like.

Although the steps, operations, or computations may be presented in a specific order, the order may be changed in particular embodiments. Other orderings of the steps are possible, depending on the particular embodiment. In some particular embodiments, multiple steps shown as sequential in this specification may be performed at the same time. Also, some embodiments may not have all of the steps shown and/or may have other steps instead of, or in addition to, those shown herein.

The following are example embodiments directed to an example use case of the system scheduling a meeting. In this example, the system enables a user to use the application to create a meeting request in which the user can add other users to a group, this group being the participating users. Once a meeting (event) request is created, the participating users will receive a notification via email, text, push notification, or any notification of the like indicating the user is requested to attend a meeting. The user may choose a date via a calendar on which the user is available. The user is then able to select a time or range of times on the selected date or dates on which the user is available. If more dates are desired to be selected, the user is able to add more dates via the calendar and time selection menus. Once the desired dates and available times have been selected, the system determines the meeting date and time which accommodates each user, and notify the users of the best availability. The system uses AI and machine learning to compute or derive the meeting date and time based on the availability input received from the participating users and information learned by the application based on each participant. The users are then able to schedule the meeting, or select an alternative meeting date and time from an alternative time menu.

As indicated herein, the system may utilize AI to learn and obtain information about the users (meeting participants) to accurately derive an optimal meeting time for the selected participants of an event. The application may utilize AI to parse text from users to learn about scheduling availability and preferences for each user to gain additional informant about each user's past preferences. This allows the present application to work with both small and large teams and understand group dynamics of hosts and participants to allow for multi-person scheduling. The present application may be represented by the AI agent on a website, via email, instant messaging platform, and the like. The features of the present scheduling application allow for end-to-end email workflow, advanced natural language processing (NLP) using generative pretrained transformers, machine learning (ML) based schedule recommendations (i.e., learns not to schedule times when participants are unavailable), multi-person scheduling, team link generation (one link schedules different participants at different times), and follow-up capabilities which notice when participants don't respond and sends helpful reminders.

The system may include multiple team link modes, where the system chooses who will be included in the event. The system determines a time based on all of the members of a team, only one member of a team, a plurality of members of a team, a leader of a team, a leader and a member or plurality of members of a team, and the like based on the team link mode.

In addition to the AI agent, the system may enable a client application to be directly embedded into any web page. The embedded mode will be more neutral or configurable in terms of style and color to match the host page. The system may provide copy and paste hypertext markup language (HTML) that can be embedded into any page.

The system enables a user to host a meeting by creating a customized event. A host may log into their application profile, again via the user's Google account/profile or others of the like. The host may then select to create a custom event (e.g., meeting, etc.) where the host is able to specify an event name, duration, a range of dates, a location or link to a web conferencing tool, a personalized message, and other meeting information of the like. The host may invite participants to the meeting, the participants being notified via email, text, push notification, or any notification of the like. The participants then select dates and times in which they are available for the meeting. Once availability information is received from each participant, the best availability meeting date time is derived, and the participants are notified. In the event that the derived meeting date and time is not optimal, alternative meeting dates and times are provided and may be selected. Once the desired meeting date and time is selected, all participants receive a notification with the event details or a link to view the event details within the application. The scheduling application of the present disclosure may be linked to various digital collaboration tools such as Zoom, Skype, Microsoft Teams, and others of the like, allowing meetings to take place on the users desired platform.

At any time in the process, the system enables users to be added and removed from the attendee list. If a user that is not registered with the application receives an invite to a meeting, the user may be prompted to create a profile with the application. In the event that all participants have not submitted an availability response, a reminder notification may be sent to participants to submit their availability information. Once an event is created, the participants list may be viewed in the application, allowing more participants to be invited or removed. The application allows users to view upcoming events, again allowing users to invite additional participants to different events and/or cancel events.

Figure 9:
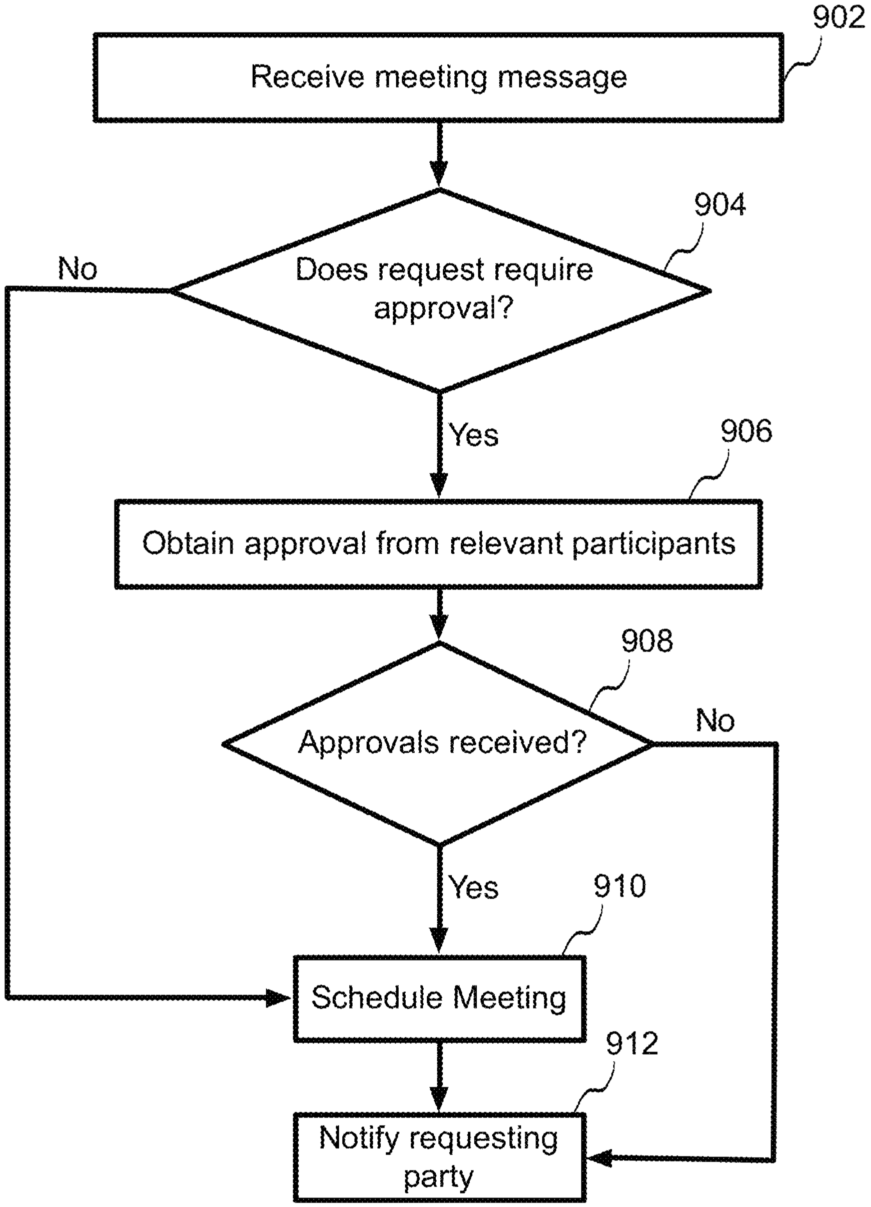
FIG. 9 is an example flow diagram for scheduling meetings, according to some embodiments.

FIG. 9 is an example flow diagram for scheduling meetings, according to some embodiments. Referring to both FIGS. 1 and 9, a method is initiated at block 902, the system receives a meeting message. The message may be an email requesting a meeting.

At block 904, the system determines if the meeting message (request) requires approval, where the invited meeting participants may each approve the meeting. In some embodiments, the system may enable a subset of the meeting participants or all of the meeting participant to approve the meeting date and time. If no, the flow continues to block 910, where the system schedules the meeting. If yes, the flow continues to block 906.

At block 906, the system obtains approval from relevant meeting participants.

At block 908, the system determines if approvals have been received. In some embodiments, if multiple approval are needed, the system may require a percentage or all of the invited meeting participants to approve the date and time of the meeting. If no, the flow continues to block 912, where the system notifies the requesting party. of the decision. If yes, the flow continues to block 910.

At block 910, the system schedules the meeting.

At block 912, the system notifies requesting party. The requesting part is the meeting host.

Although the steps, operations, or computations may be presented in a specific order, the order may be changed in particular embodiments. Other orderings of the steps are possible, depending on the particular embodiment. In some particular embodiments, multiple steps shown as sequential in this specification may be performed at the same time. Also, some embodiments may not have all of the steps shown and/or may have other steps instead of, or in addition to, those shown herein.

Figure 10:
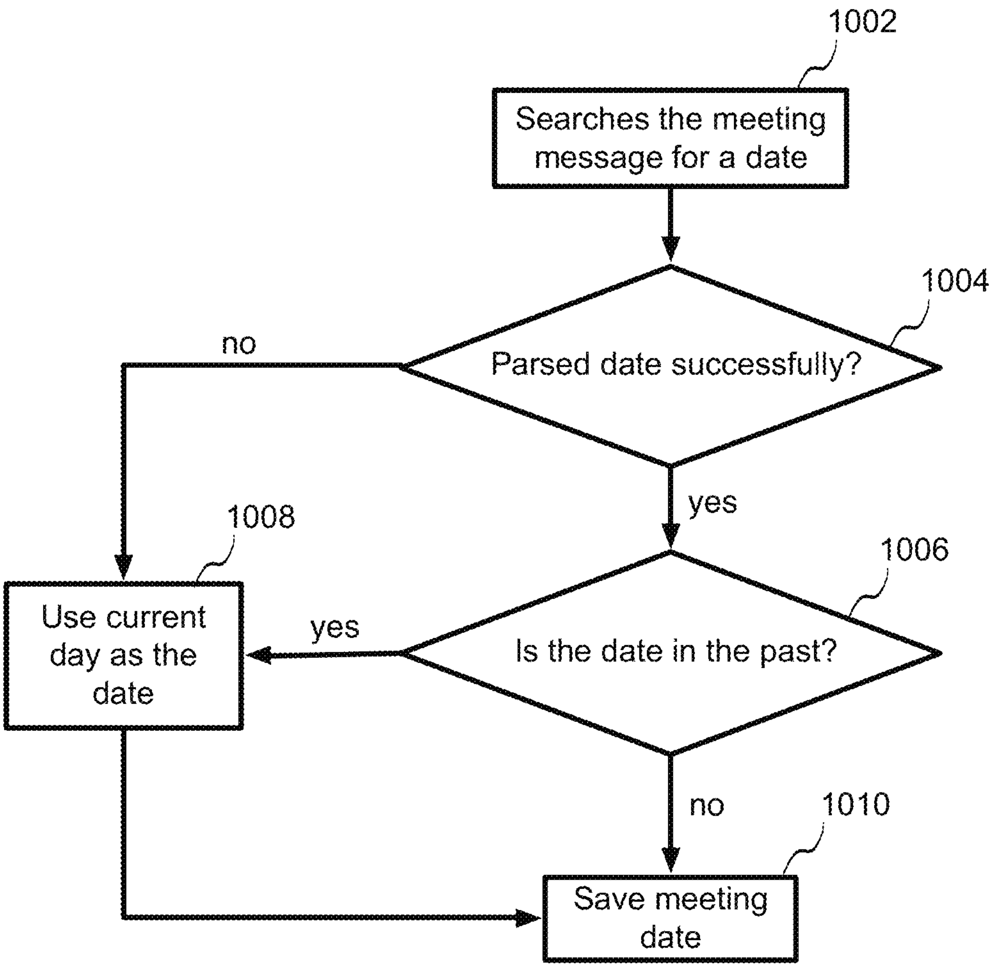
FIG. 10 is an example flow diagram for determining an appropriate date for the scheduling meetings, according to some embodiments, according to some embodiments.

FIG. 10 is an example flow diagram for determining an appropriate date for the scheduling meetings, according to some embodiments, according to some embodiments. While the example flow diagram of FIG. 10 is described in the context of determining an appropriate meeting date, a similar flow diagram may be used to determine an appropriate meeting time. Referring to both FIGS. 1 and 10, a method is initiated at block 1002, the system searches the text of the meeting message for a date. The system parses the text of the meeting message to extract the date.

At block 1004, the system determines of the date was parsed successfully. If no, the flow continues to block 1008, where the system uses the current day as the date. If yes, the flow continues to block 1006.

At block 1006, the system determines if the date in the meeting message is in the past. If no, the flow continues to block 1010. If yes, the flow continues to block 1008.

At block 1008, the system uses the current day as the date.

At block 1010, the system saves the meeting date. The system uses the saved meeting to schedule the meeting.

Although the steps, operations, or computations may be presented in a specific order, the order may be changed in particular embodiments. Other orderings of the steps are possible, depending on the particular embodiment. In some particular embodiments, multiple steps shown as sequential in this specification may be performed at the same time. Also, some embodiments may not have all of the steps shown and/or may have other steps instead of, or in addition to, those shown herein.

Figure 11:
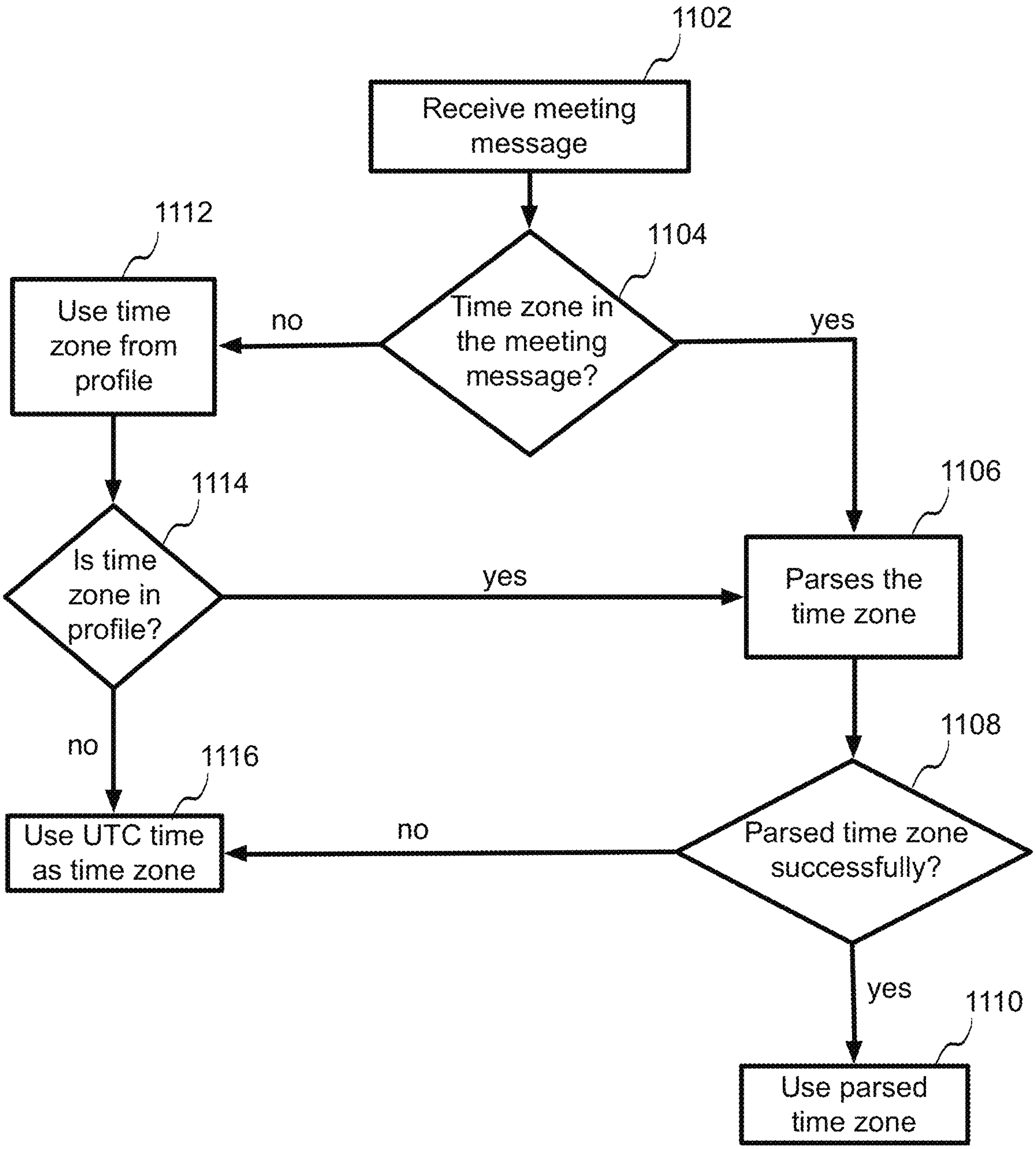
FIG. 11 is an example flow diagram for determining an appropriate time zone for the scheduling meetings, according to some embodiments.

FIG. 11 is an example flow diagram for determining an appropriate time zone for the scheduling meetings, according to some embodiments. Referring to both FIGS. 1 and 11, a method is initiated at block 1102, the system receives a meeting message from the meeting host.

At block 1104, the system determines if a time zone is in the message. If no, the flow continues to block 1112, where the system uses a time zone from a profile associated with the meeting requestor who sent the meeting request. If yes, the flow continues to block 1106.

At block 1106, the system parses the time zone.

At block 1108, the system determines if the time zone was successfully parsed. If no, the flow continues to block 1116, where the system uses UTC time as the time zone. If yes, the flow continues to block 1110.

At block 1110, the system uses the parsed time zone.

At block 1112, the system uses a time zone from profile associated with the meeting requestor who sent the meeting request if the system does not find a time zone in the meeting message, at block 1104.

At block 1114, the system determines if there is a time zone is in the profile. If no, the flow continues to block 1116, where the system uses UTC time as the time zone. If yes, the flow continues to block 1106, where the system parses the time zone.

Although the steps, operations, or computations may be presented in a specific order, the order may be changed in particular embodiments. Other orderings of the steps are possible, depending on the particular embodiment. In some particular embodiments, multiple steps shown as sequential in this specification may be performed at the same time. Also, some embodiments may not have all of the steps shown and/or may have other steps instead of, or in addition to, those shown herein.

Figure 12:
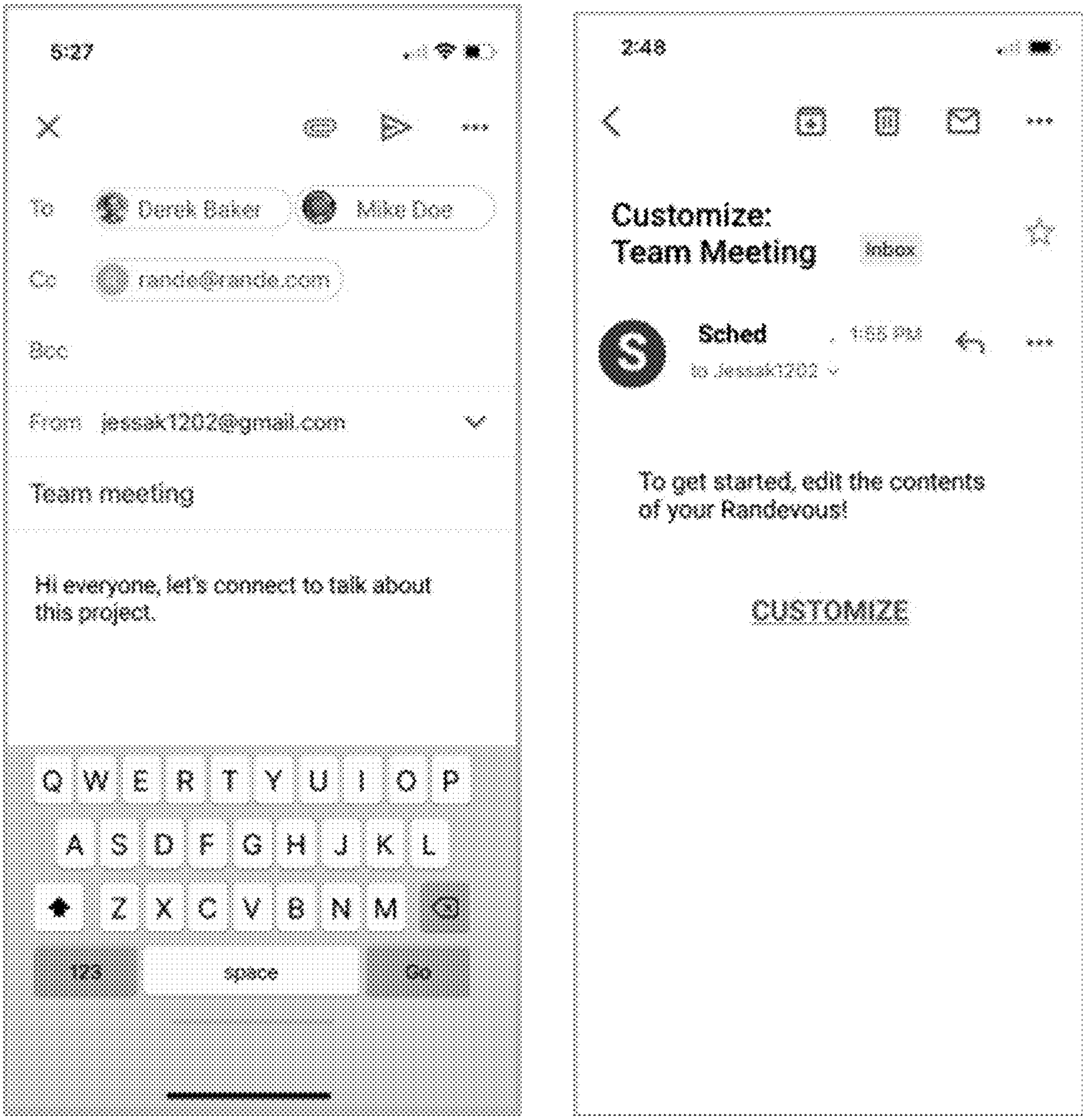
FIGS. 12-16 show example screenshots on a user device showing a process for a meeting host to create and schedule a meeting or event on the application of the present disclosure.
Figure 13:
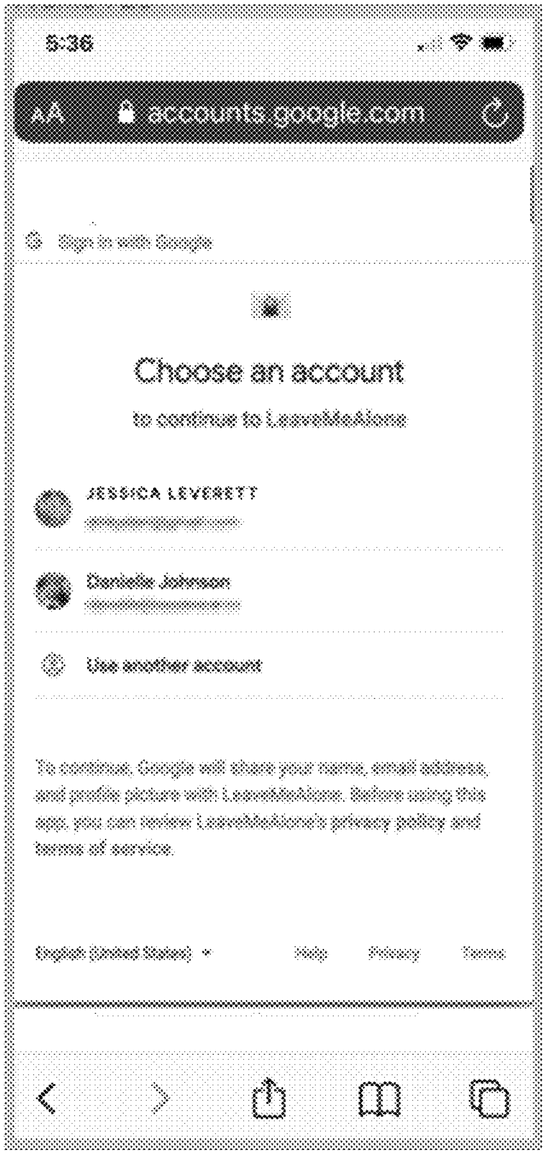
Figure 14:
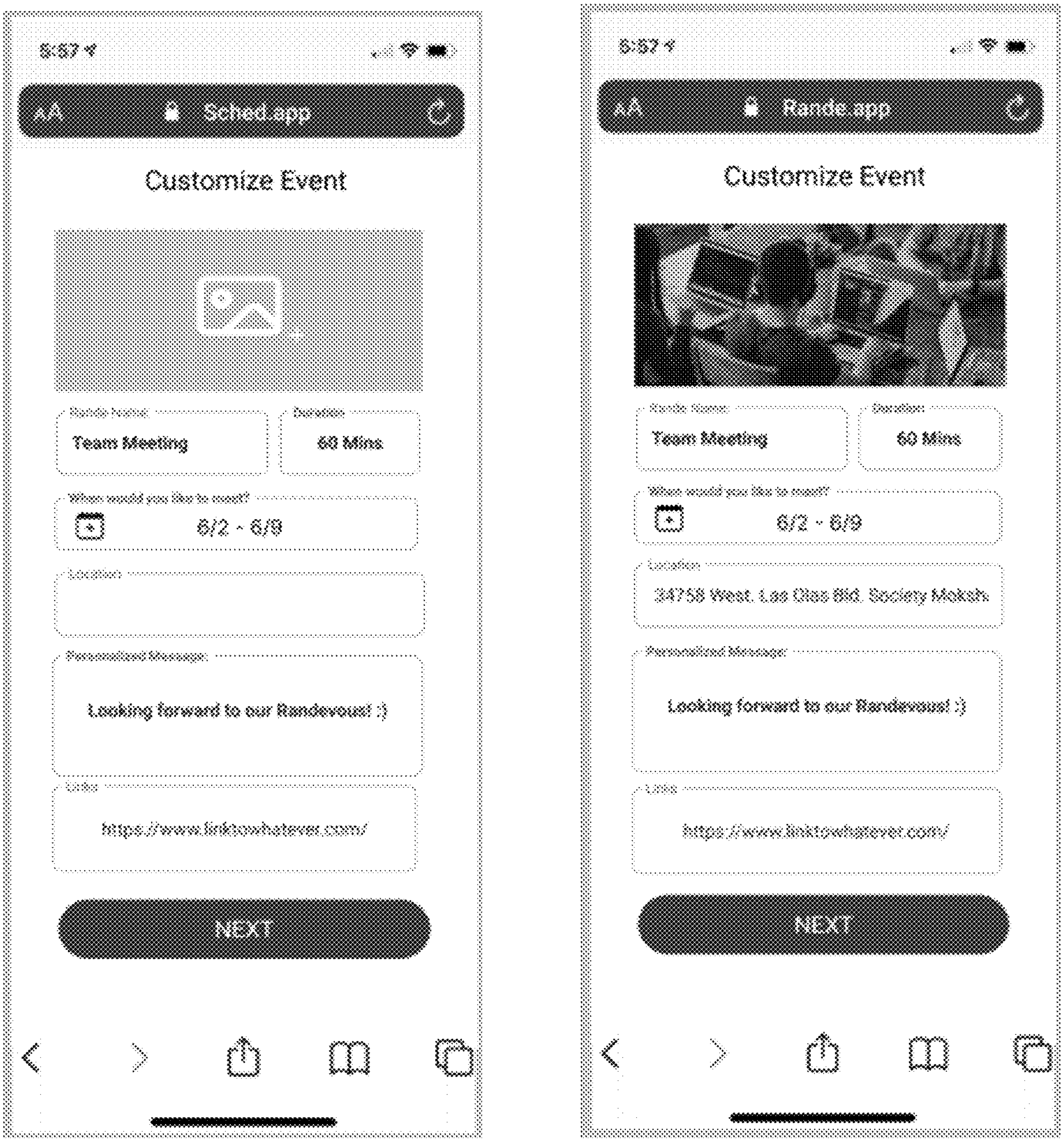
Figure 15:
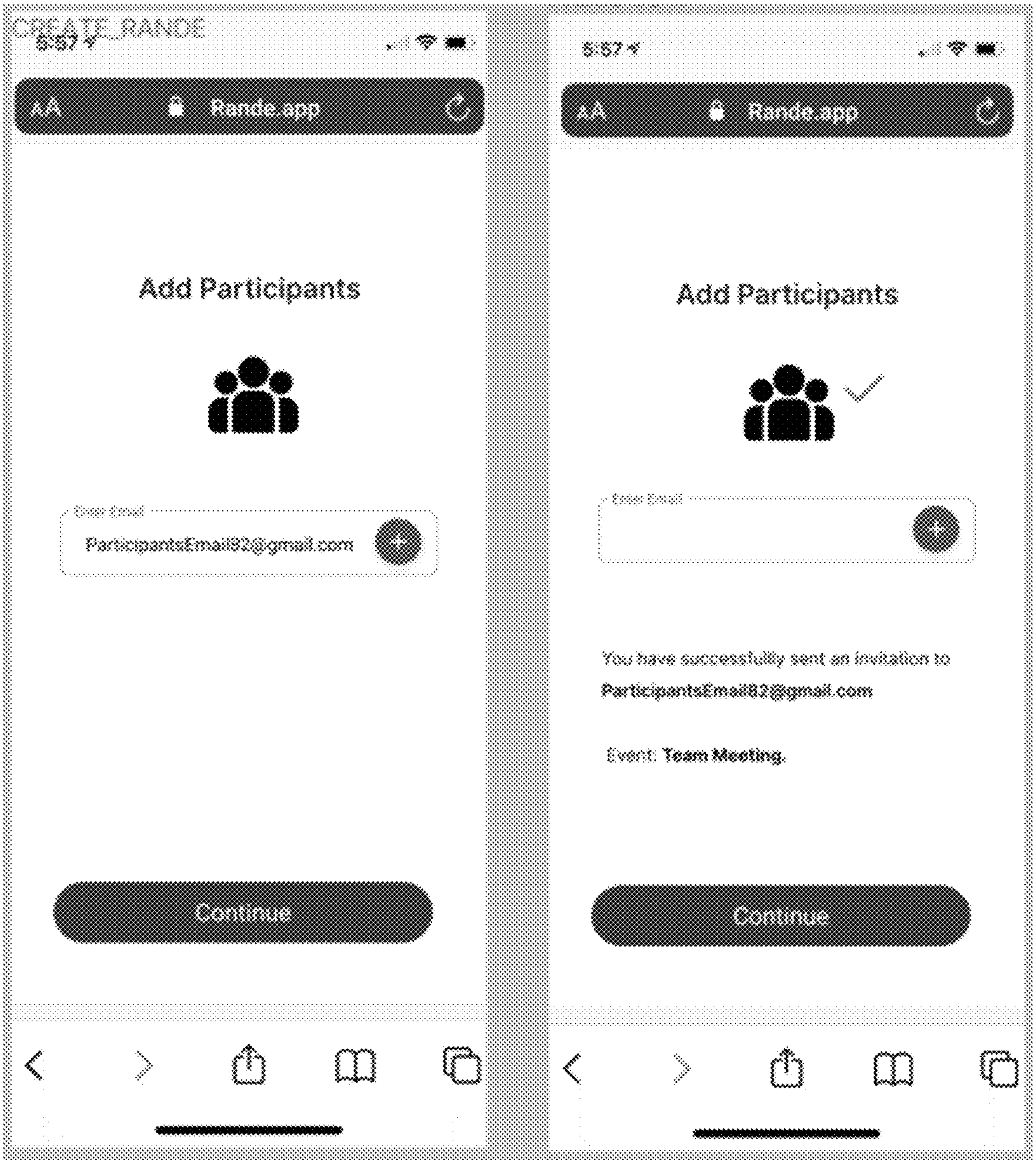
Figure 16:

FIGS. 12-16 show example screenshots on a user device showing a process for a meeting host to create and schedule a meeting or event on the application of the present disclosure. While various embodiments are described in the context of a meeting, these embodiments and others may apply to events in general including gathers for social, teambuilding, celebratory events. FIG. 12 shows screenshots 1200 of a user device displaying a notification. The notification is an invitation to participants to join a meeting and a link (labeled "CUSTOMIZE") to set up a custom event on the application of the present disclosure. FIG. 13 is a screenshot 1300 of a user device showing the Google account login webpage, which enables a user to login to the application and system of the present disclosure. As indicated herein, the person or user initiating the scheduling of a meeting may be referred to as a user initiating the meeting, the user, the host, or the leader, etc., depending on the context and/or scenario. These terms may be used interchangeably. Once the user is logged in, if the user is the host of the proposed meeting, a customize event page will be utilized to create the meeting, as shown in the screenshots 1400 of FIG. 14. Once the meeting information is filled out, the user will be prompted to add participants via the prompt shown in the screenshots 1500 of FIG. 15. When all of the desired participants are added to the meeting, the application may display the confirmation page as shown the screenshot 1600 of FIG. 16, indicating that the meeting has been created.

Figure 17:
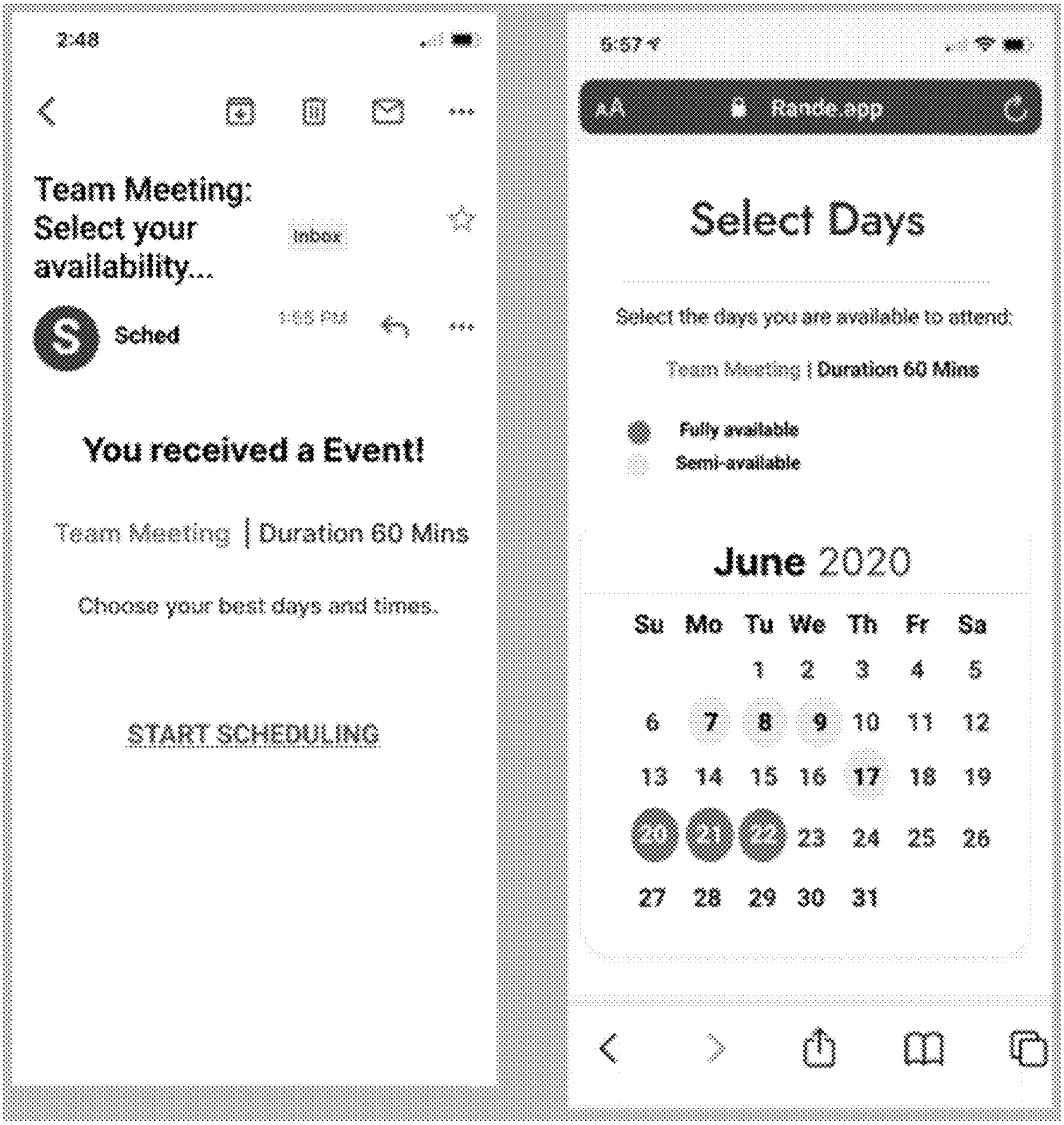
FIGS. 17-26 show example screenshots on a user device showing a process for receiving a meeting request and submitting participant information to schedule an event.
Figure 18:
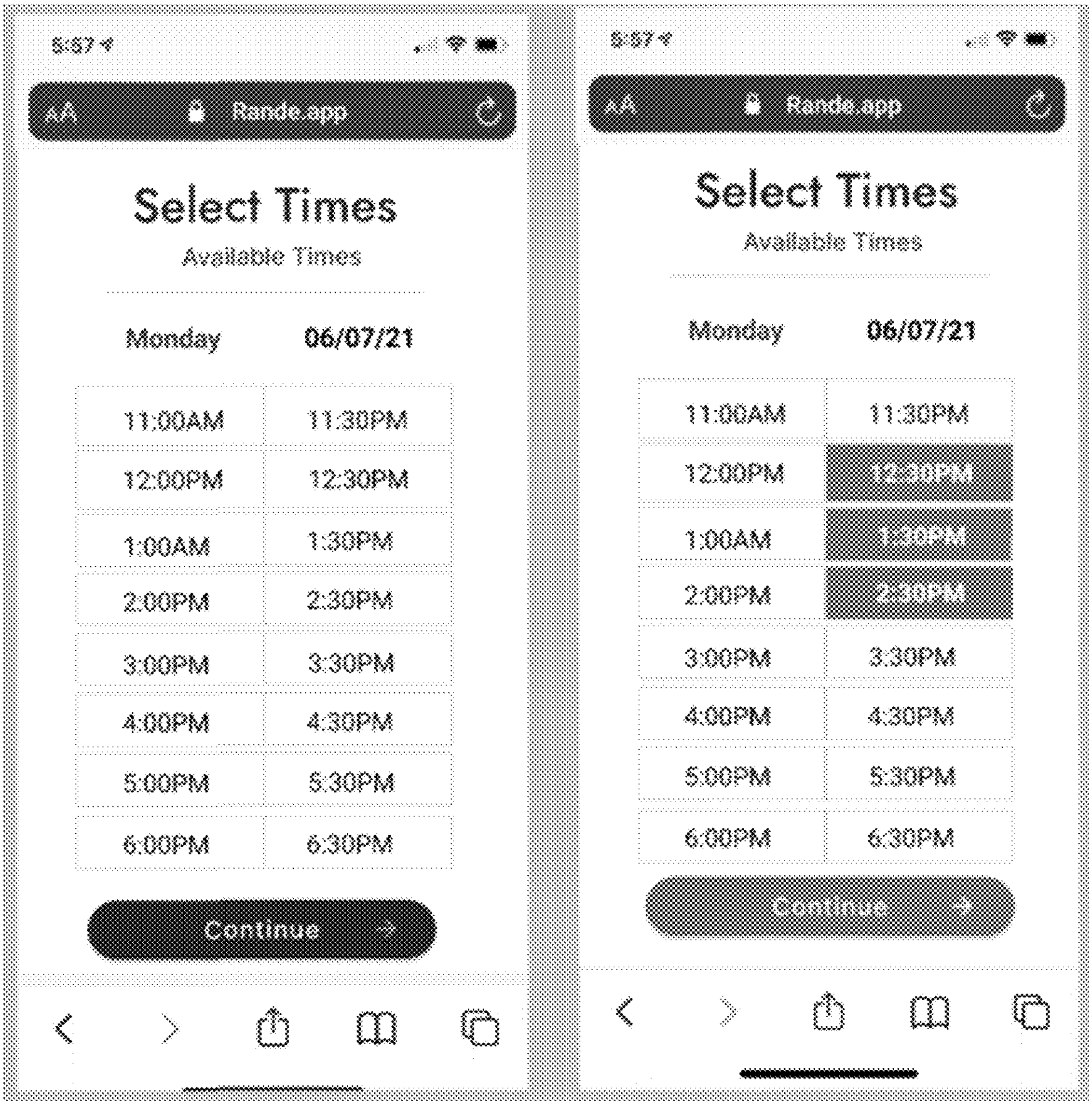

FIGS. 17-26 show example screenshots on a user device showing a process for receiving a meeting request and submitting participant information to schedule an event. FIG. 17 shows screenshots 1700 showing the user device displaying a notification indicating that the user has received an event. The notification may include a link for the user to begin the scheduling process, the user being prompted to select a date or range of dates in the application in which the user may be available. Once the dates are selected, the user is prompted to select times which represent the user's availability on a selected date, which is shown in the screenshots 1800 of FIG. 18. Once the selections are made the application will give the user the option to select additional dates. If the user chooses to select additional dates, the user will again be prompted to select dates and times.

Figure 19:
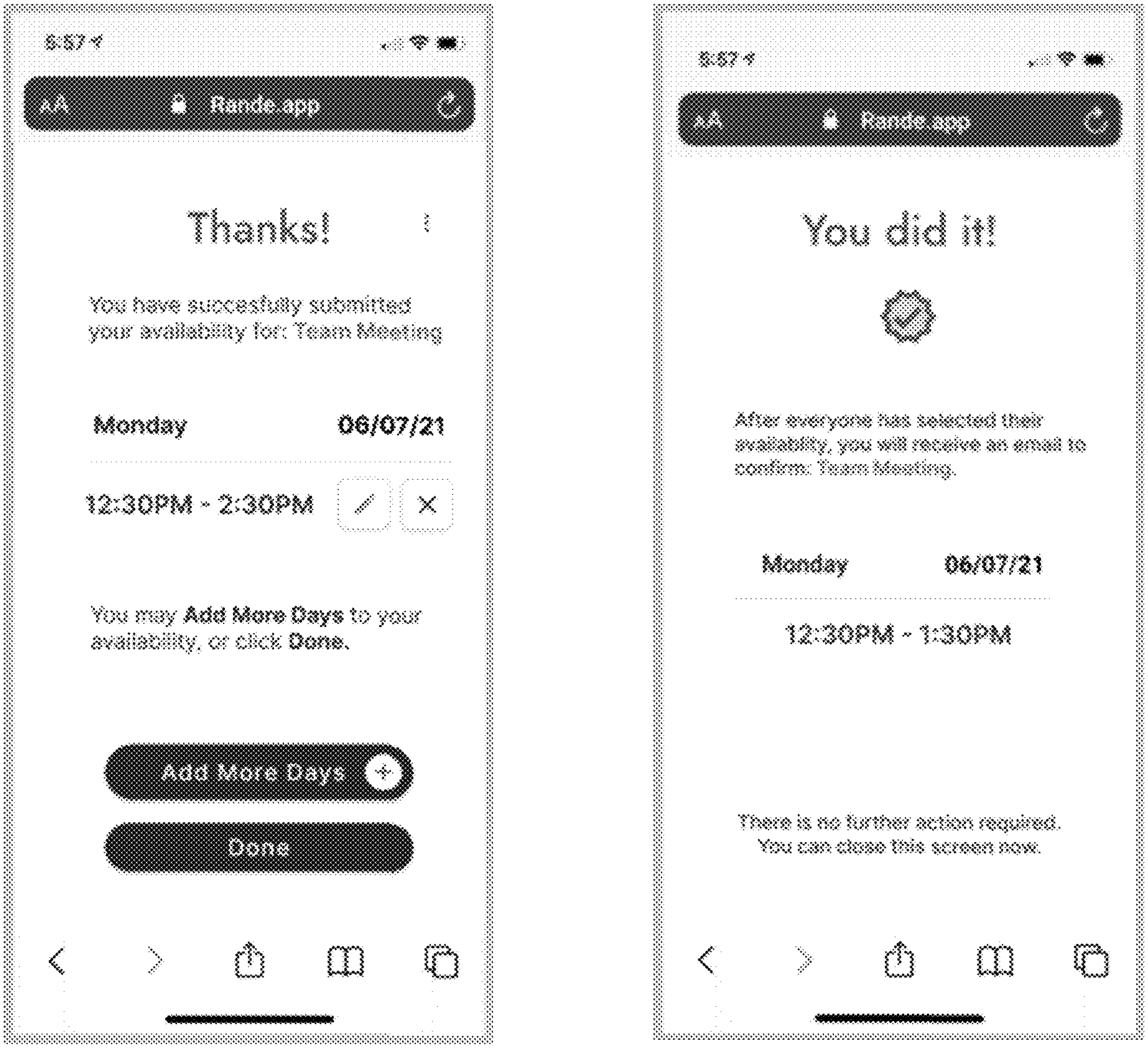
Figure 20:
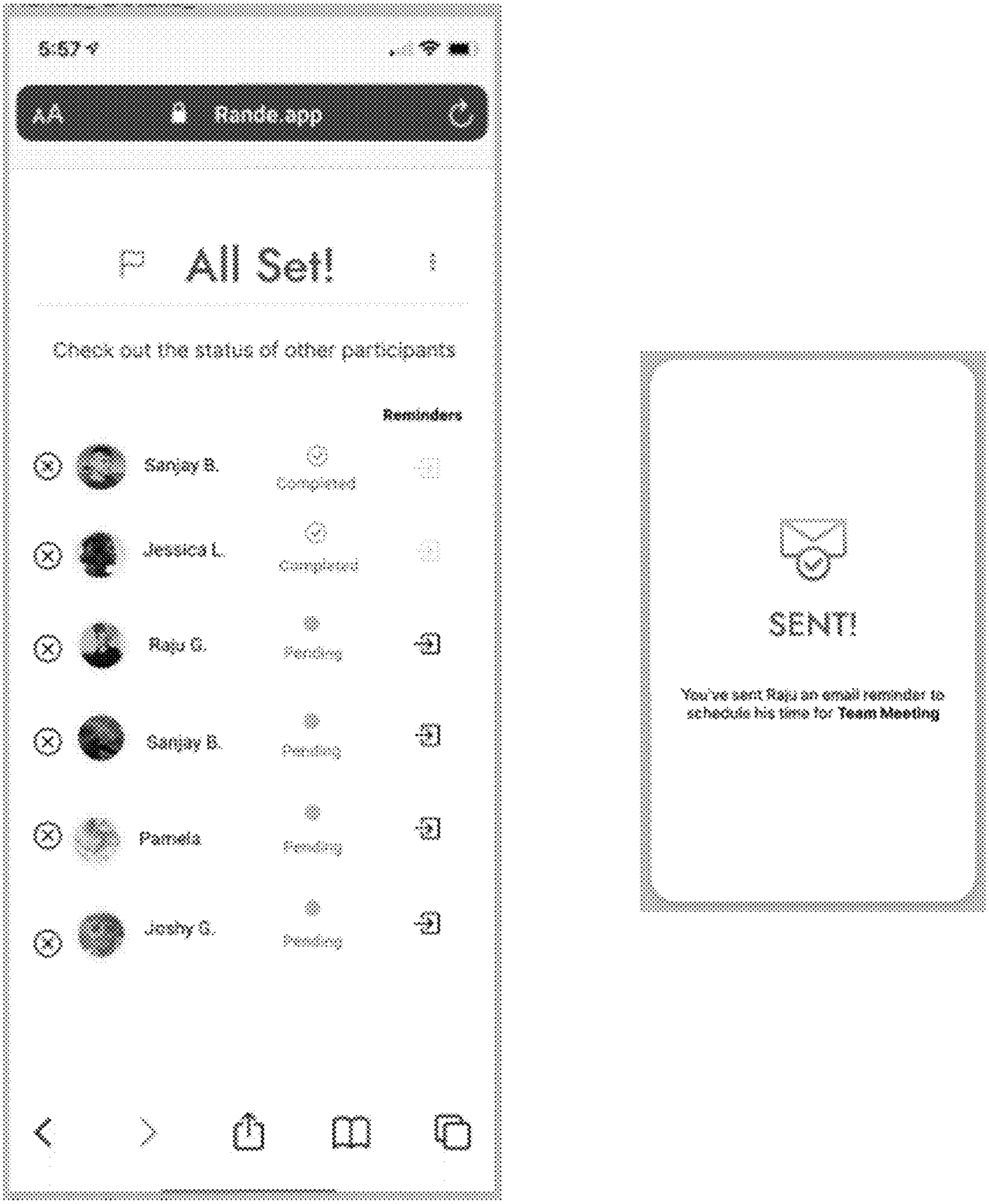
Figure 21:
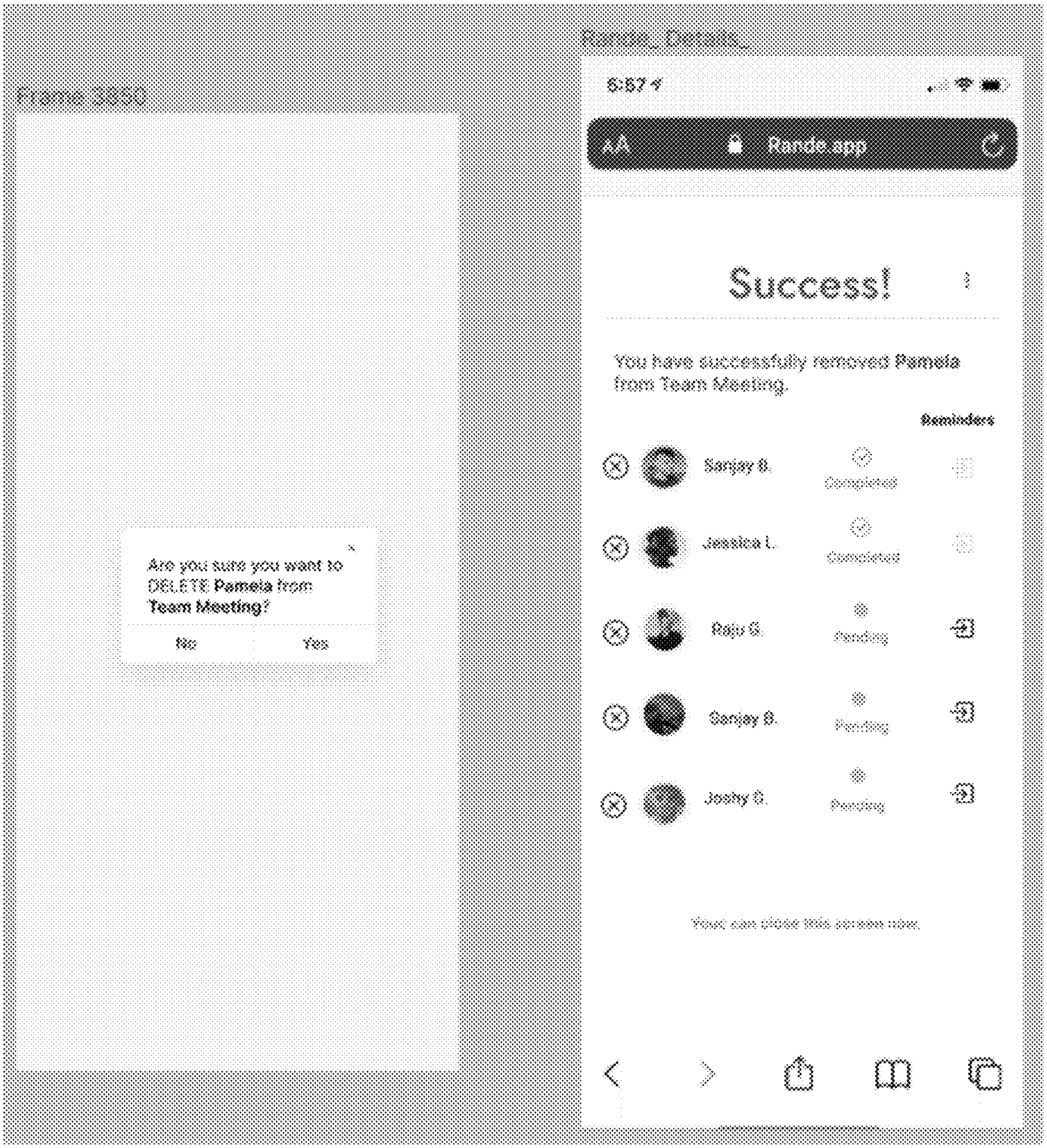
Figure 22:
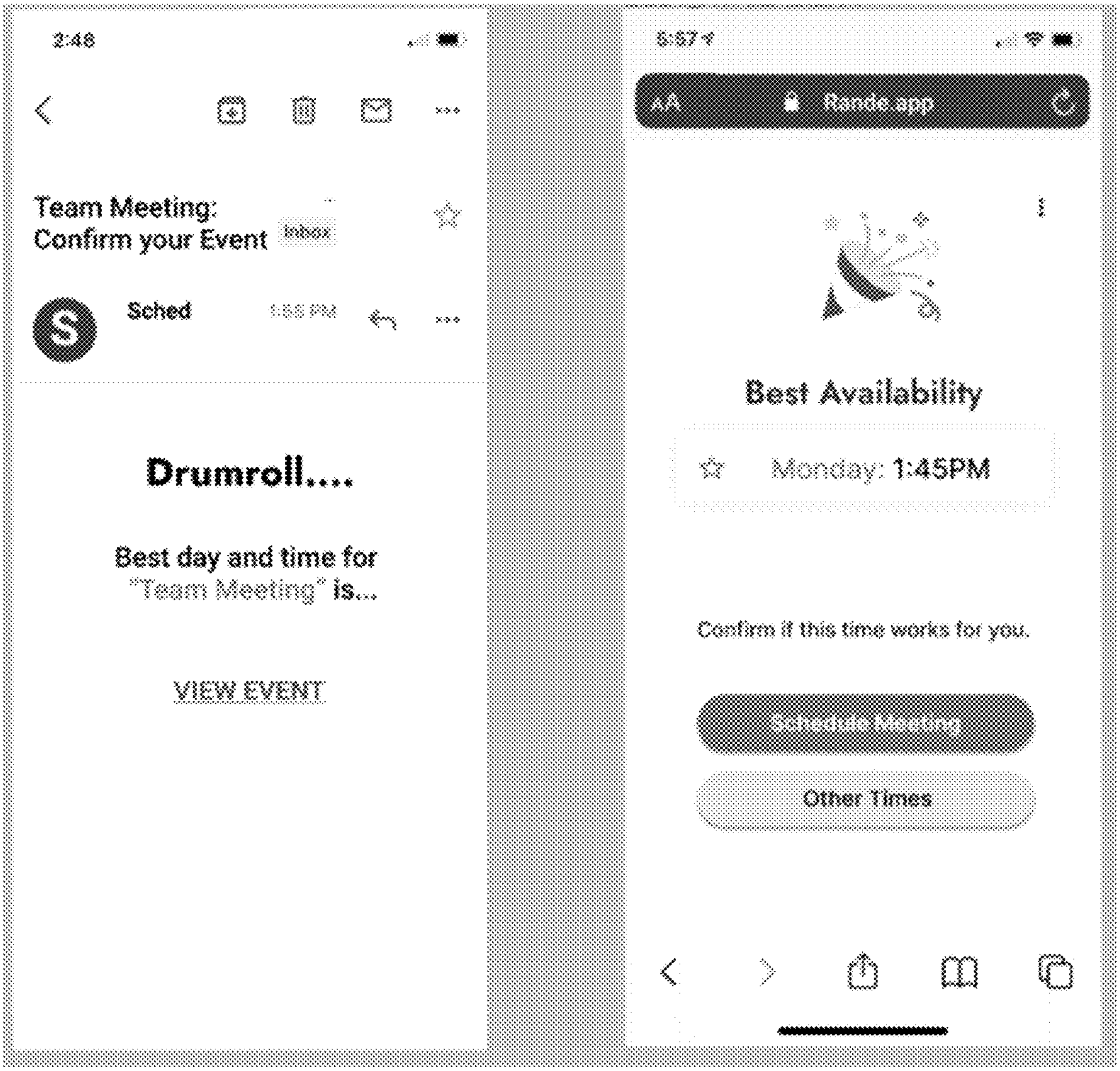
Figure 23:
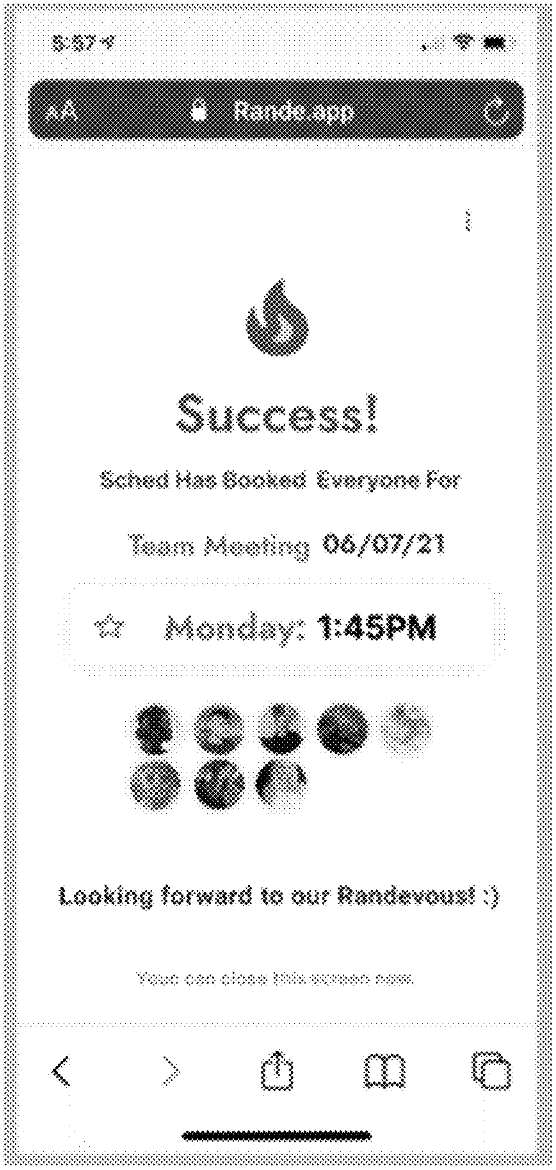
Figure 24:
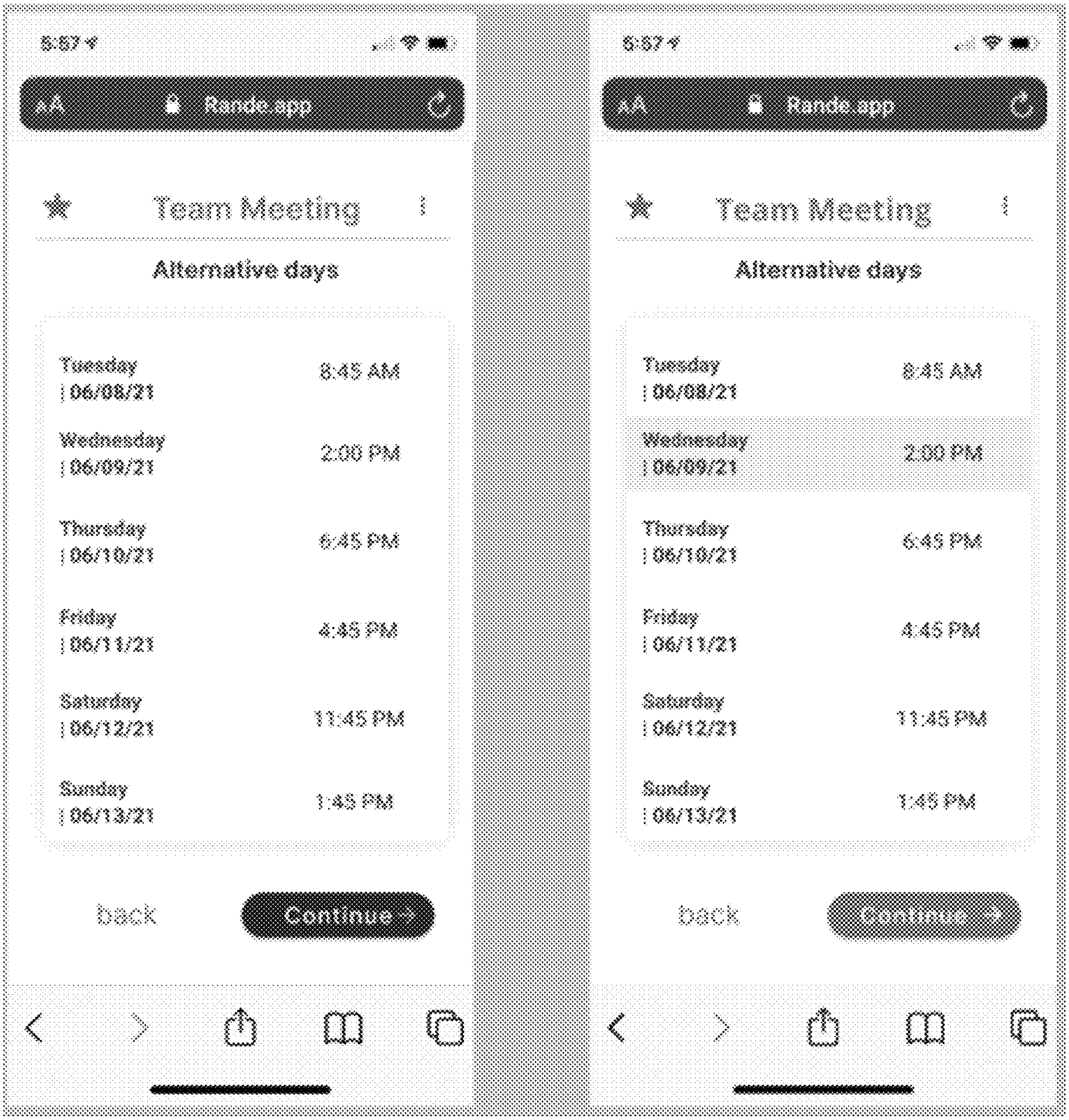
Figure 25:
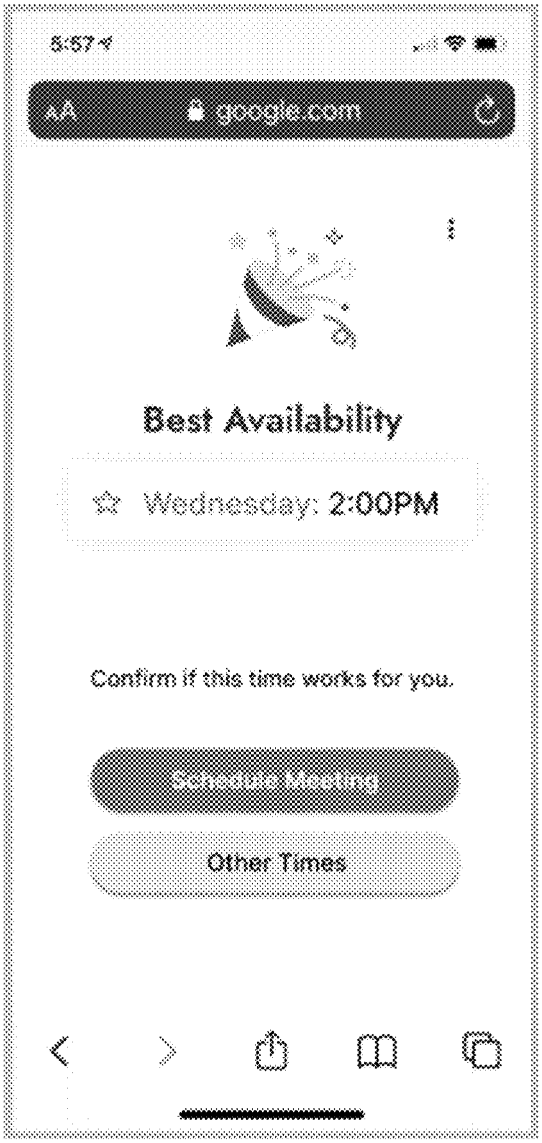
Figure 26:
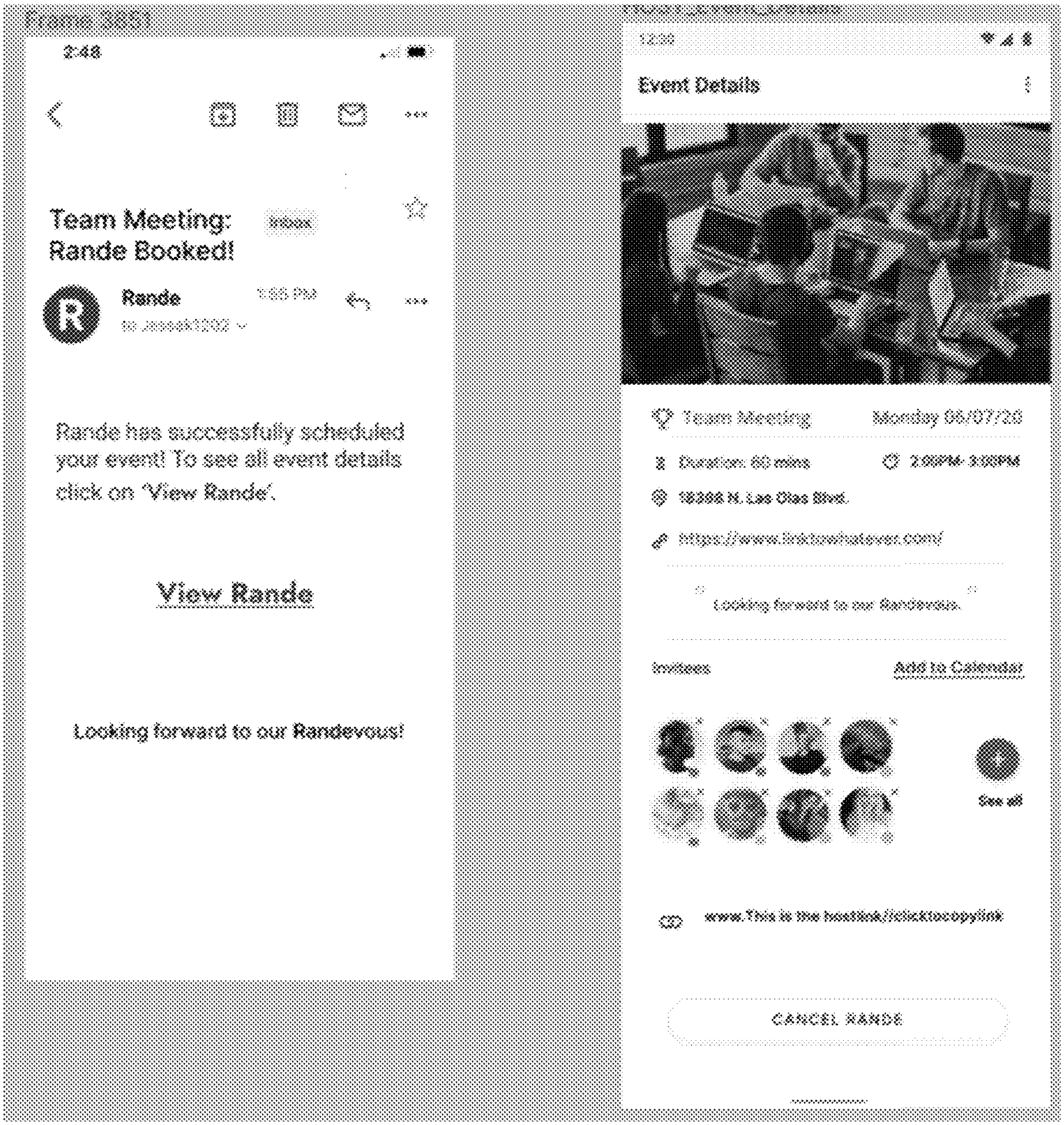

FIG. 19 shows screenshots 1900 showing confirmation pages. FIG. 20 shows screenshots 2000 showing a user device displaying a status page in the present scheduling application. From this page the user is able to view the status of other participants and also allows reminder notifications to be sent to participants. Users are also able to remove participants from the event as shown in the screenshots 2100 of FIG. 21. Once each participant inputs their respective availability, the application derives the optimal meeting date and time. The participants will receive a notification as shown in the screenshots 2200 of FIG. 22, and the users will be given the option to schedule the meeting or view other times. Once the meeting is scheduled the application may display a confirmation page as shown in the screenshot 2300 of FIG. 23, displaying the meeting date and time. If the participants select to choose a different date and time for the meeting, the application will give a plurality of additional options as shown in the screenshots 2400 of FIG. 24. FIG. 25 shows a screenshot 2500 of the confirmation page after the selection of the alternative meeting date and time is made. FIG. 26 shows screenshots 2600 of notification alerting participants that the meeting has been scheduled, including a link to the application event details page.

Figure 27:
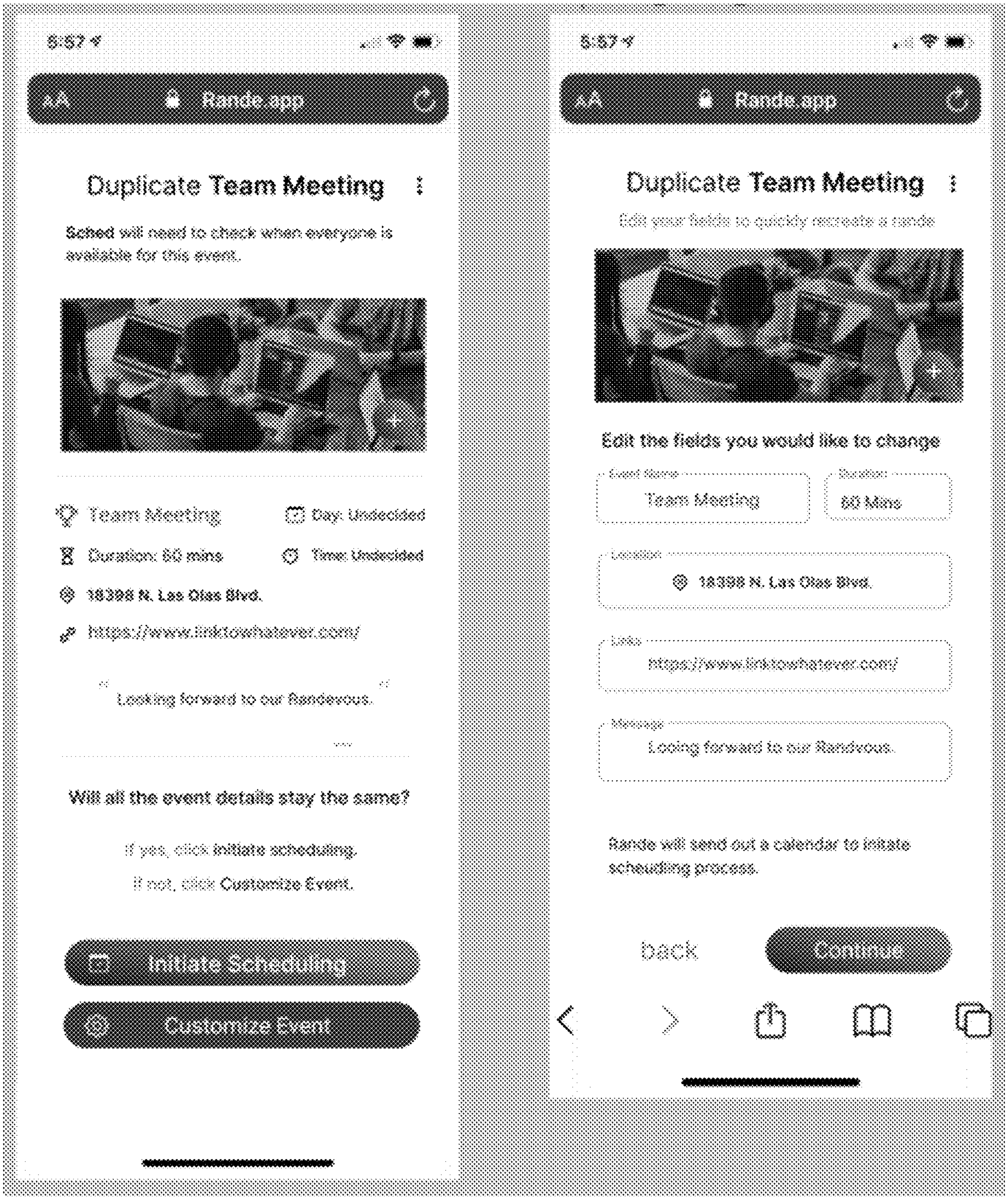
FIGS. 27-28 show example screenshots on a user device showing a process for duplicating a meeting.
Figure 28:
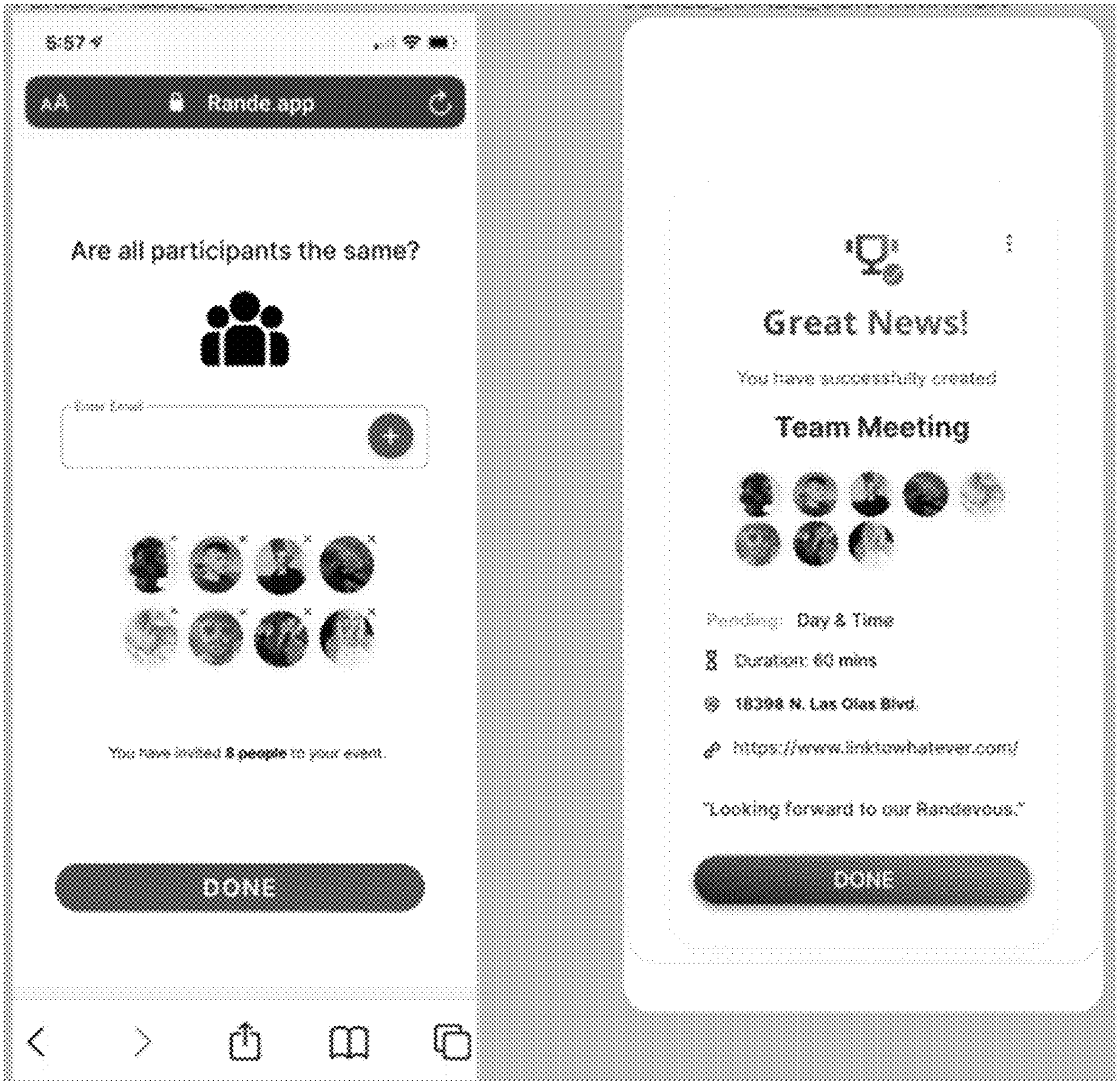

FIGS. 27-28 show example screenshots on a user device showing a process of duplicating a meeting. To duplicate a meeting a user can select to duplicate an existing or past meeting and will be prompted as seen in the screenshots 2700 of FIG. 27. Again, the user can provide information for the meeting such as the event name, duration, location, link to a web conferencing tool, message, and other information of the like. FIG. 28 shows screenshots 2800 showing a prompt for additional participants to be added (e.g., by entering an email, etc.) and showing a confirmation page displaying that the meeting has been successfully created.

Figure 29:
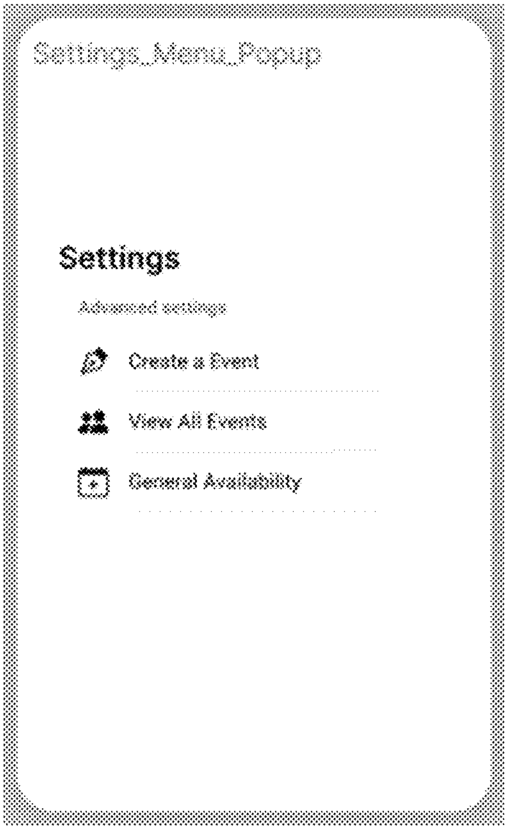
FIG. 29 shows an example screenshot on a user device showing a settings page in the application of the present disclosure.
Figure 30:
FIG. 30 shows example screenshots on a user device showing the option for a participant to joint an event and the confirmation page displaying that the event has been successfully joined.

FIG. 29 shows an example screenshot 2900 on a user device showing a settings page in the application of the present disclosure. This settings page allows new events to be created as well as to view all events and edit the user's general availability. FIG. 30 shows example screenshots 3000 on a user device showing the option for a participant to joint an event and the confirmation page displaying that the event has been successfully joined.

Figure 31:
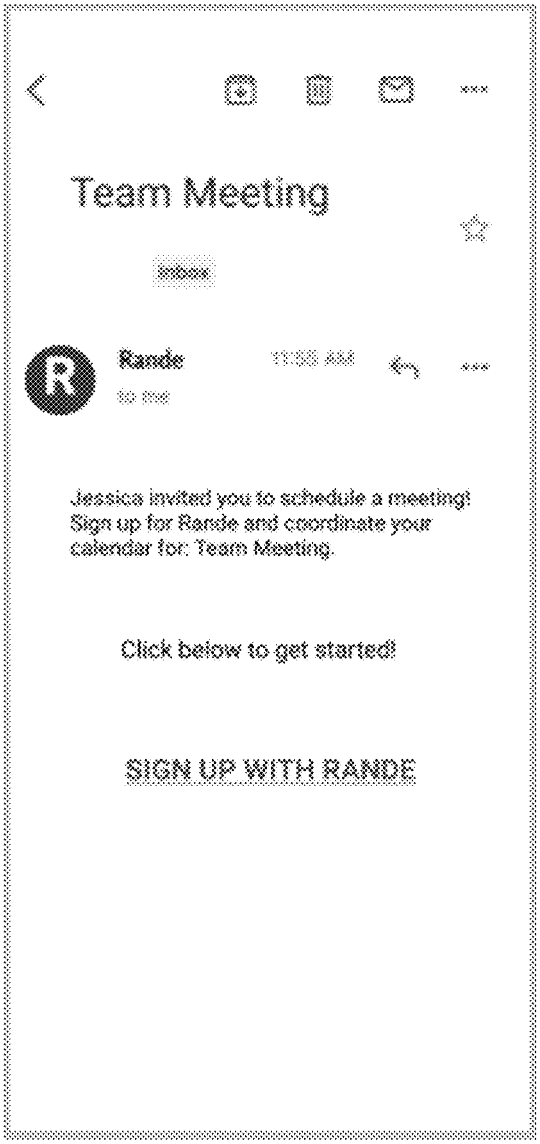
FIGS. 31-34 show example screenshots on a user device showing a process for a user creating a profile in the application of the present disclosure.
Figure 32:
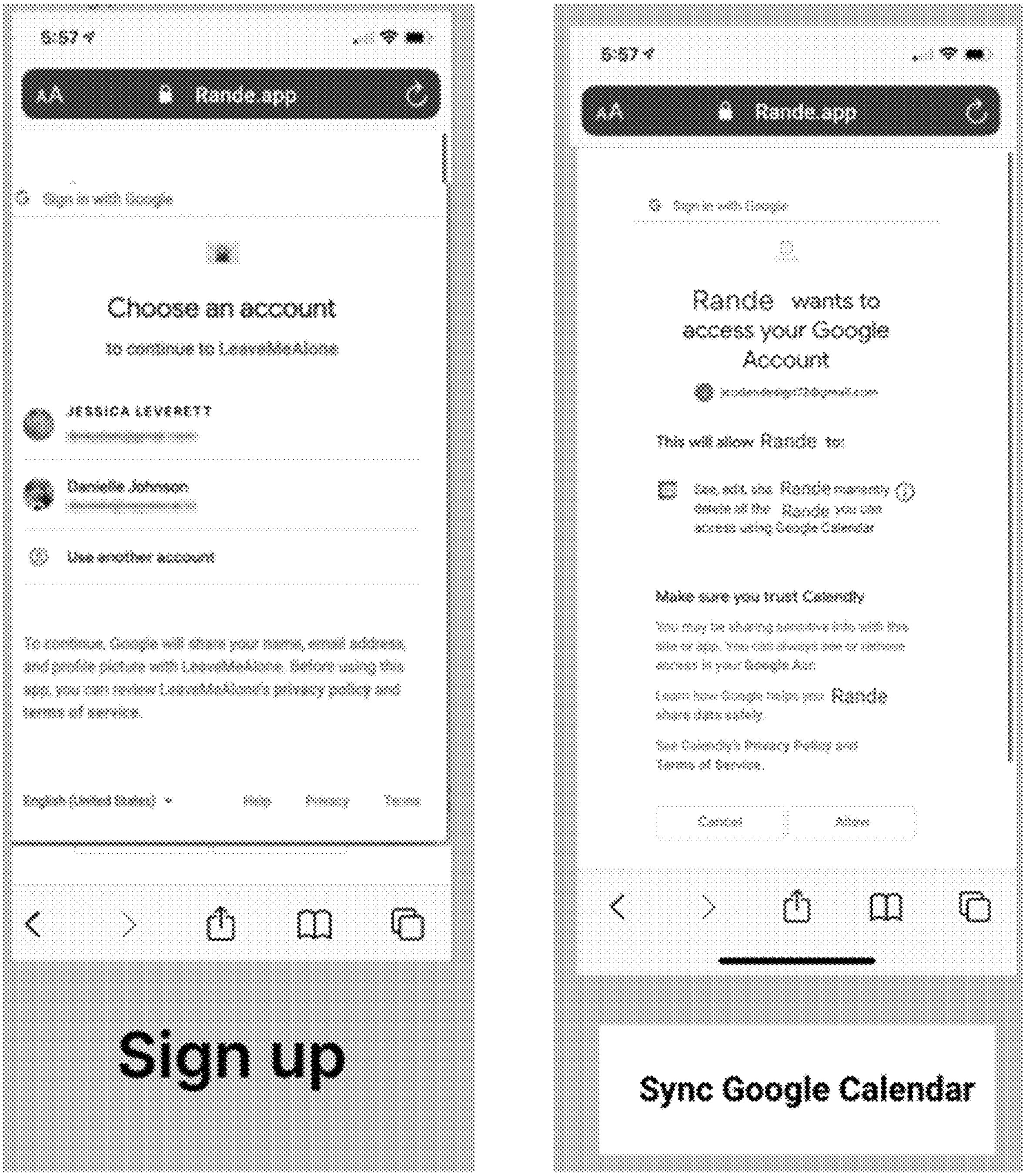
Figure 33:
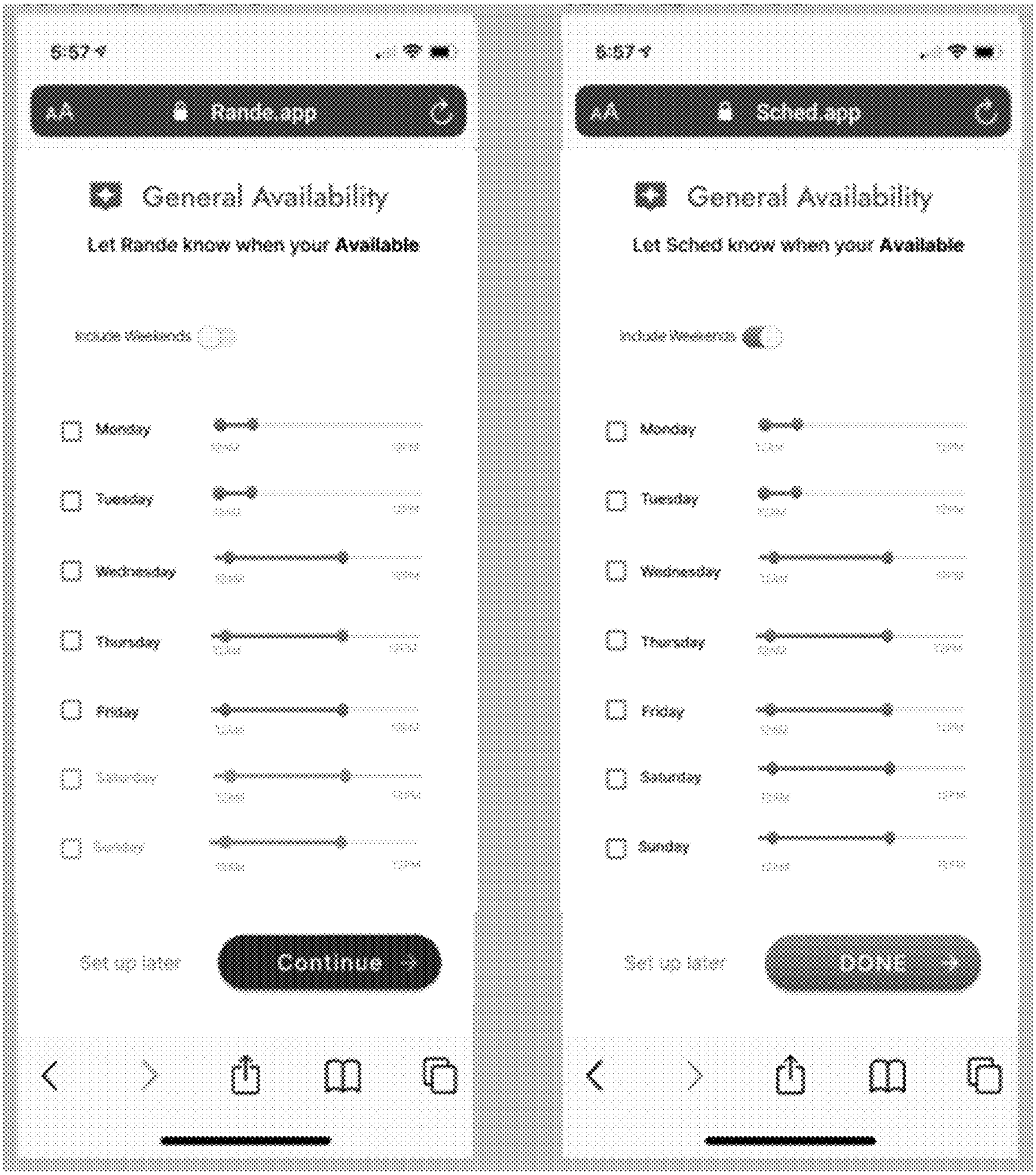
Figure 34:
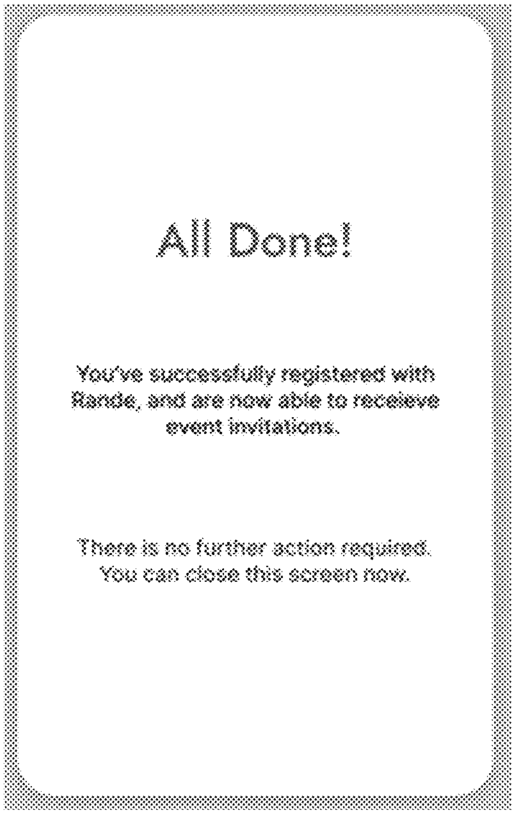

FIGS. 31-34 show example screenshots on a user device showing a process for a user creating a profile in the application of the present disclosure. Such as user may be an invited meeting participant. FIG. 31 shows a screenshot 3100 of a notification prompting the user to create an account for the scheduling application. The notification may include a link to a registration page of the application. FIG. 32 shows screenshots 3200 associated with a login process if the user chooses to login with an existing web account, such as a Google account or the like. FIG. 33 shows screenshots 3300 of general availability input pages, allowing new or existing users of the application to input general availability information to aid in the scheduling process. Once a user creates an account in the application, the user may be presented with a confirmation page as shown in the screenshot 3400 of FIG. 34.

Figure 35:
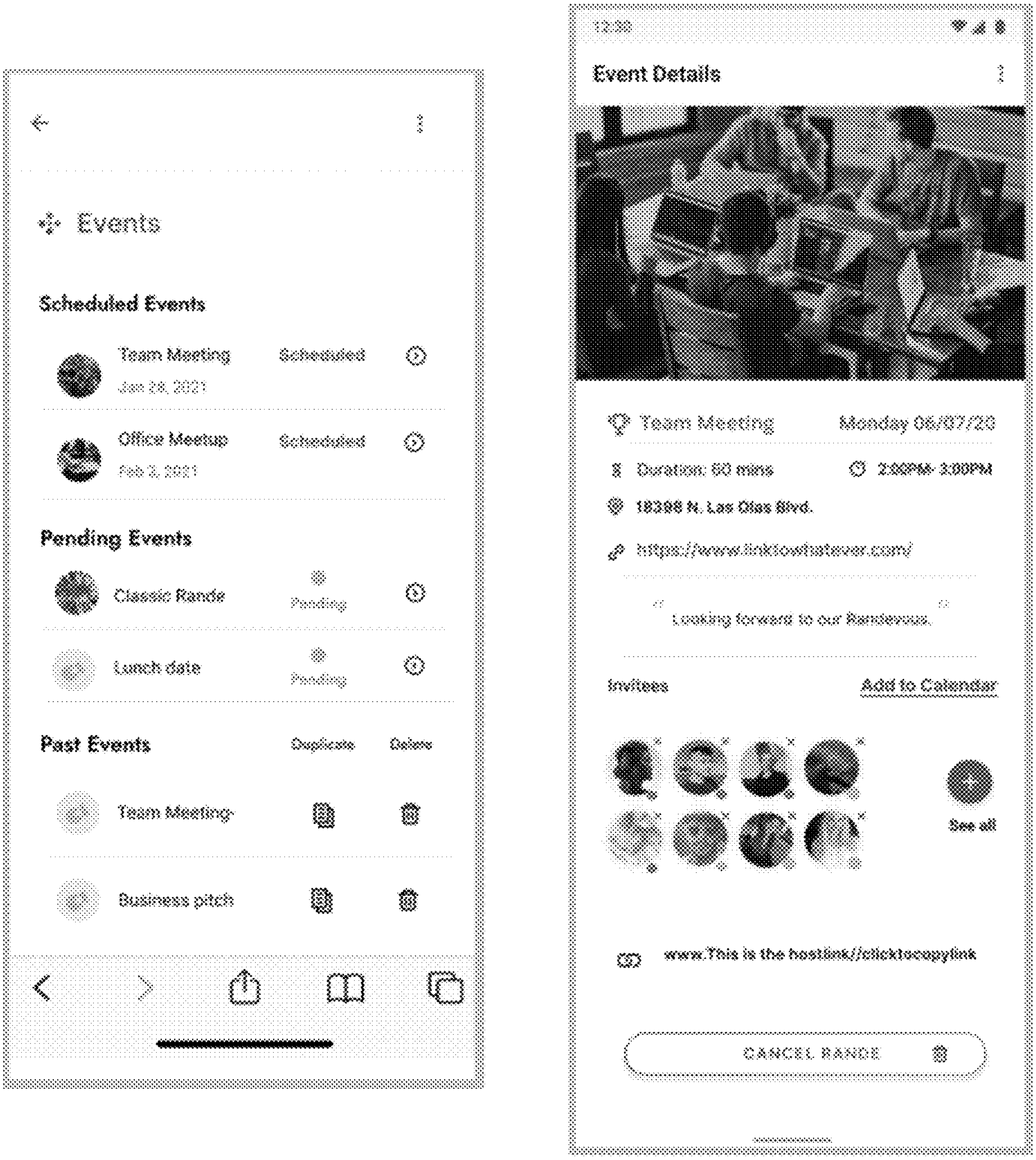
FIG. 35 shows example screenshots on a user device showing events pages.
Figure 36:
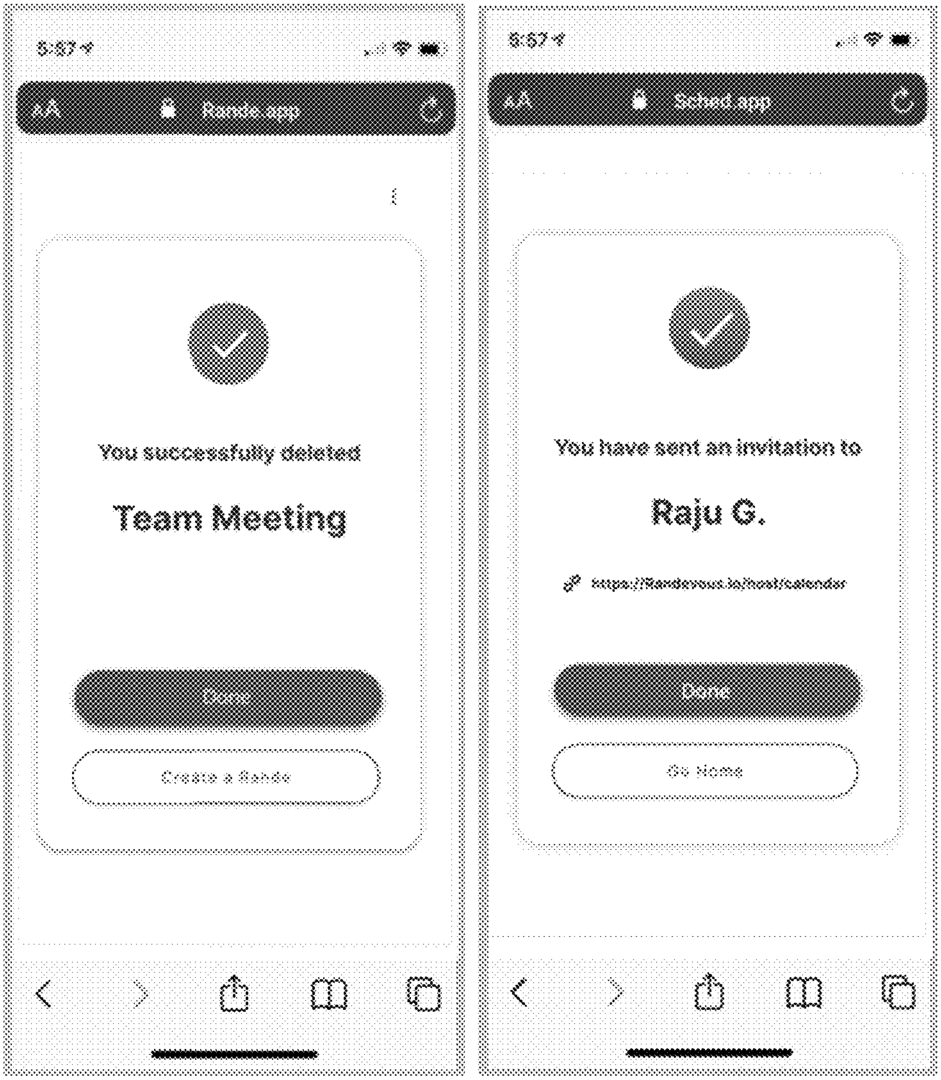
FIG. 36 shows screenshots showing a plurality of confirmation screens which can be presented following a plurality of actions such as deleting an event, sending invitations, and removing participants.

FIG. 35 shows example screenshots 3500 on a user device showing events pages. On these pages, the system enables users to select events and perform a plurality of actions such as delete events, view event details, invite additional participants, and other actions of the like. FIG. 36 shows screenshots 3600 showing a plurality of confirmation screens which can be presented following a plurality of actions such as deleting an event, sending invitations, and removing participants.

Further, the present disclosure provides a Flask-powered interactive voice response (IVR) system with enhanced user engagement and session continuity. Traditional IVR systems are often hindered by static, inflexible response flows and suboptimal session handling, resulting in user dissatisfaction and operational inefficiencies. The present disclosure addresses these shortcomings by introducing a novel IVR architecture, leveraging the Flask web framework's capabilities to offer a more dynamic, responsive, and user-centric interaction model. The present disclosure reimagines IVR technology by integrating Flask's versatile web application features with sophisticated session management strategies. This synergy results in a system that not only responds to user inputs with unprecedented fluidity, but also maintains a contextual conversation history across calls. Key innovations include: adaptive conversation flows, tailored in real-time based on user responses; persistent, cross-call session tracking, enabling a seamless user experience; and modular design allows easy integration with various external APIs and services. This IVR system is structured around several core components:

Flask Web Application Core: Acts as the nerve center, orchestrating user interactions and responses.

State-Aware Session Management: Utilizes filesystem-based storage to maintain a continuous user interaction narrative, even across multiple separate calls.

Dynamic Voice Response Engine: Powered by advanced algorithms to generate context-sensitive responses and prompts, enhancing user engagement.

Robust Logging Mechanism: Provides insightful analytics on user interactions, aiding in continuous system improvement.

Thus, the present disclosure provides a Flask-based IVR system characterized by dynamic user interaction capabilities and robust session continuity. Session data is persistently managed, enabling a cohesive and continuous user experience across multiple telephonic interactions. The response engine intelligently adapts to user inputs, crafting personalized conversational flows. This innovative IVR system harnesses the Flask framework's power to revolutionize telephonic user interactions. This system stands out for its ability to maintain engaging, context-aware conversations with users over multiple sessions, marking a significant leap in the field of automated voice communication. This elevates user satisfaction by offering a more intuitive and responsive telephonic interaction experience, reduces operational inefficiencies by retaining user context over multiple sessions, and provides a scalable and flexible framework adaptable to diverse industry needs. This advanced IVR system is versatile, and suitable for a range of applications including customer support, appointment setting, information dissemination, and any other scenario where enhanced telephonic user interaction is desired.

Figure 37:
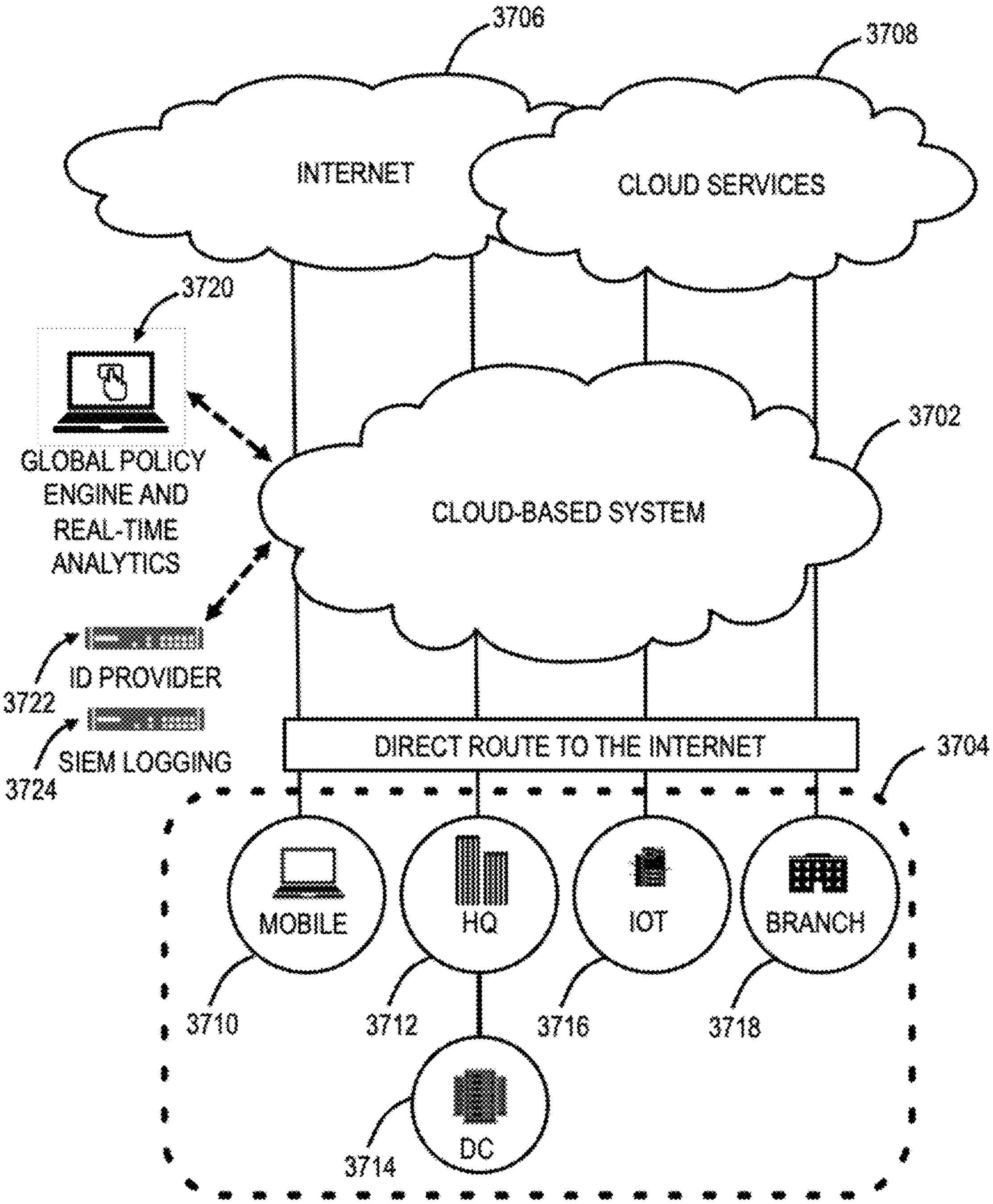
FIG. 37 is a network diagram of a cloud-based system environment, which may be used to implement embodiments described herein.

FIG. 37 is a network diagram of a cloud-based system environment 3700, which may be used to implement embodiments described herein. In various embodiments, the cloud-based system environment 3700 includes a cloud-based system 3702, which provides a secure internet and web gateway as a service to various users 3704, as well as other cloud services. In this manner, the cloud-based system environment 3700 is located between the users 3704 and the Internet 3706 as well as any cloud services 3708 (or applications) accessed by the users 3704. As such, the cloud-based system environment 3700 provides inline monitoring inspecting traffic between the users 3704, the Internet 3706, and the cloud services 3708, including secure sockets layer (SSL) traffic. The cloud-based system environment 3700 can offer access control, threat prevention, data protection, etc. The access control can include a cloud-based firewall, cloud-based intrusion detection, uniform resource locator (URL) filtering, bandwidth control, domain name system (DNS) filtering, etc. Threat prevention can include cloud-based intrusion prevention, protection against advanced threats (malware, spam, cross-site scripting (XSS), phishing, etc.), cloud-based sandbox, antivirus, DNS security, etc. The data protection can include data loss prevention (DLP), cloud application security such as via a cloud access security broker (CASB), file type control, etc.

Figure 40:
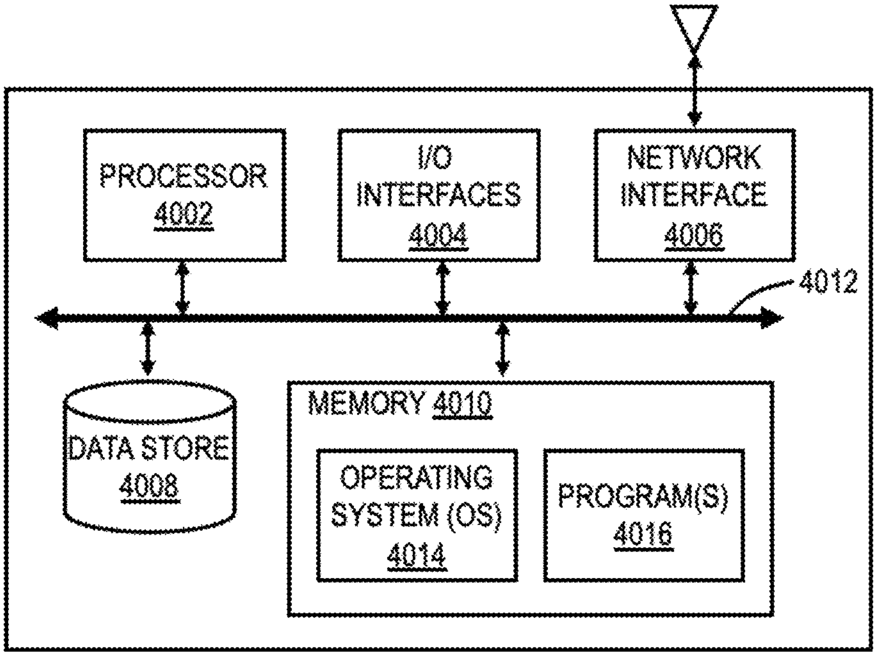

For illustration purposes, the users 3704 of the cloud-based system environment 3700 can include a mobile device 3710, a headquarters (HQ) 3712 which can include or connect to a data center (DC) 3714, internet of things (IOT) devices 3716, a branch office/remote location 3718, etc., and each includes one or more user devices. An example user device 4000 or user equipment (UE) is illustrated in FIG. 40. The devices 3710, 3716, and the locations 3712, 3714, 3718 are shown for illustrative purposes, and those skilled in the art will recognize there are various access scenarios and other users 3704 for the cloud-based system environment 3700, all of which are contemplated herein. The users 3704 can be associated with a tenant, which may include an enterprise, a corporation, an organization, etc. That is, a tenant is a group of users who share a common access with specific privileges to the cloud-based system environment 3700, a cloud service, etc. In an embodiment, the headquarters 3712 can include an enterprise's network with resources in the data center 3714. The mobile device 3710 can be a so-called road warrior, i.e., users that are off-site, on-the-road, etc. Those skilled in the art will recognize a user 3704 has to use a corresponding user device 4000 for accessing the cloud-based system environment 3700 and the like, and the description herein may use the user 3704 and/or a user device (e.g., user device 4000 of FIG. 40) interchangeably.

Logically, the cloud-based system environment 3700 can be viewed as an overlay network between users (at the locations 3712, 3714, 3718, and the devices 3710, 3716) and the Internet 3706 and the cloud services 3708. As an ever-present overlay network, the cloud-based system environment 3700 can provide the same functions as the physical devices and/or appliances regardless of geography or location of the users 3704, as well as independent of platform, operating system, network access technique, network access provider, etc.

There are various techniques to forward traffic between the users 3704 at the locations 3712, 3714, 3718, and via the devices 3710, 3716, and the cloud-based system environment 3700. Typically, the locations 3712, 3714, 3718 can use tunneling where all traffic is forward through the cloud-based system environment 3700. For example, various tunneling protocols are contemplated, such as general routing encapsulation (GRE), layer 2 tunneling protocol (L2TP), internet protocol security (IPsec), customized tunneling protocols, etc. The devices 3710, 3716, when not at one of the locations 3712, 3714, 3718 can use a local application that forwards traffic, a proxy such as a proxy auto-config (PAC) file, and the like. An application of the local application is the application described in detail herein as a connector application. A key aspect of the cloud-based system environment 3700 is that all traffic between the users 3704 and the Internet 3706 or the cloud services 3708 is via the cloud-based system environment 3700. As such, the cloud-based system environment 3700 has visibility to enable various functions, all of which are performed off the user device in the cloud.

The cloud-based system environment 3700 can also include a management system 3720 for tenant access to provide global policy and configuration as well as real-time analytics. The cloud-based system environment 3700 can further include connectivity to an identity provider (IDP) 3722 for authentication of the users 3704 and to a security information and event management (SIEM) system 3724 for event logging. The system 3724 can provide alert and activity logs on a per-user basis.

Figure 38:
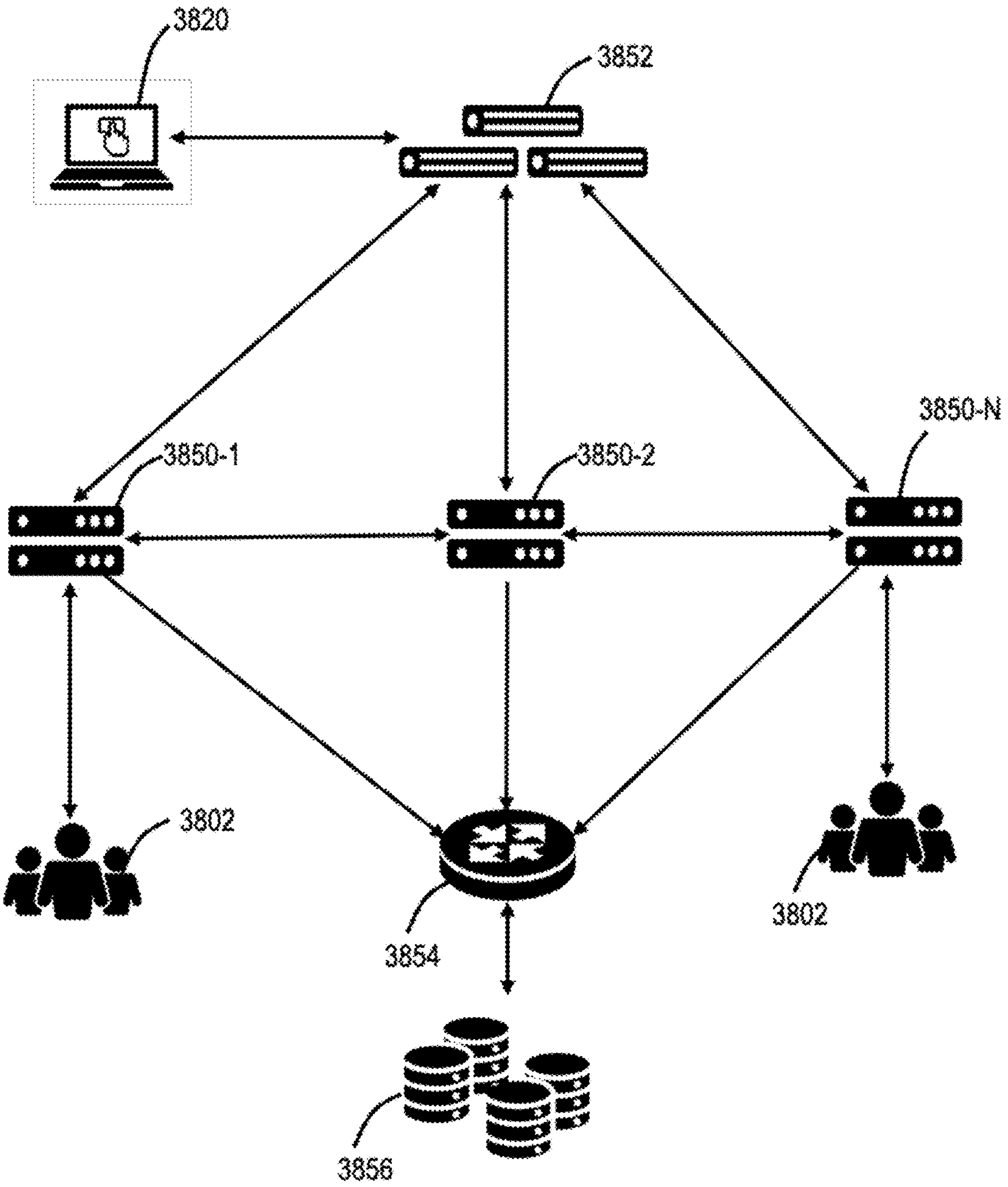
FIG. 38 is a network diagram of an example embodiment of a cloud-based system, which may be used to implement embodiments described herein.
Figure 39:
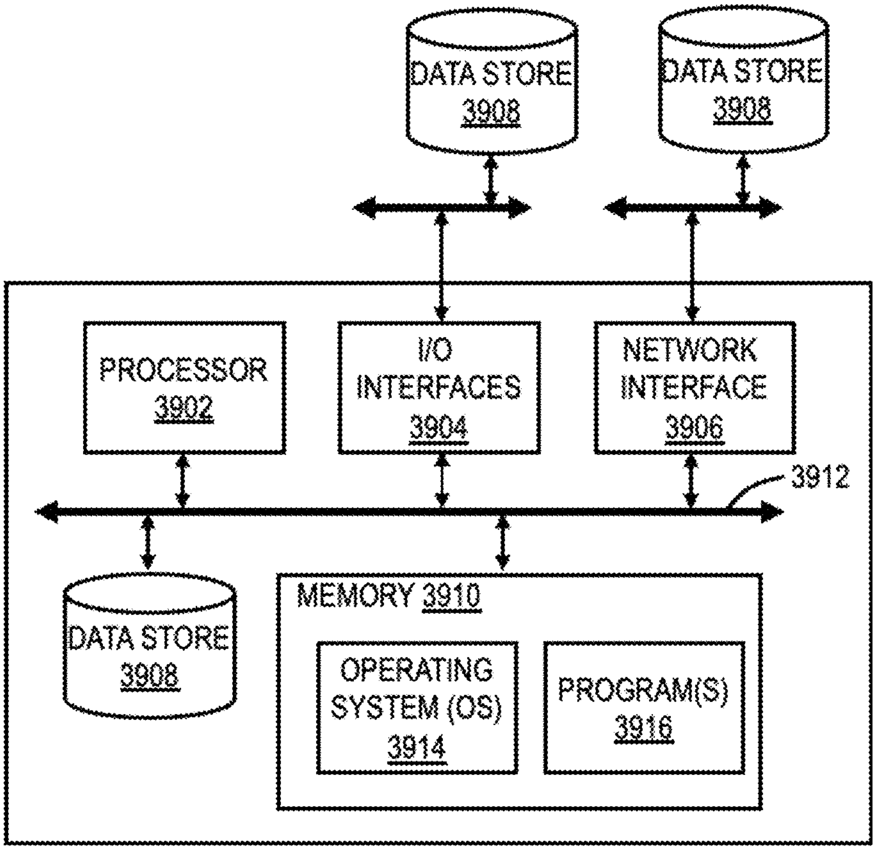

FIG. 38 is a network diagram of an example embodiment of the cloud-based system 3800, which may be used to implement embodiments described herein. The cloud-based system 3800 may be used to implement the cloud-based system 3702 of FIG. 37. In an embodiment, the cloud-based system 3800 includes a plurality of enforcement nodes (EN) 3850, labeled as enforcement nodes 3850-1, 3850-2, 3850-N, interconnected to one another and interconnected to a central authority (CA) 3852. Note, the nodes 3850 are called "enforcement" nodes 3850 but they can be simply referred to as nodes 3850 in the cloud-based system 3800. Also, the nodes 3850 can be referred to as service edges. The nodes 3850 and the central authority 3852, while described as nodes, can include one or more servers, including physical servers, virtual machines (VM) executed on physical hardware, etc. An example of a server is illustrated in FIG. 39. The cloud-based system 3800 further includes a log router 3854 that connects to a storage cluster 3856 for supporting log maintenance from the enforcement nodes 3850. The central authority 3852 provide centralized policy, real-time threat updates, etc. and coordinates the distribution of this data between the enforcement nodes 3850. The enforcement nodes 3850 provide an onramp to the users 3802 and are configured to execute policy, based on the central authority 3852, for each user 3802. The enforcement nodes 3850 can be geographically distributed, and the policy for each user 3802 follows that user 3802 as he or she connects to the nearest (or other criteria) enforcement node 3850. Of note, the cloud-based system is an external system meaning it is separate from the tenant's private networks (enterprise networks) as well as from networks associated with devices and locations such as devices 3710, 3716, and locations 3712, 3718 of FIG. 37.

The enforcement nodes 3850 are full-featured secure internet gateways that provide integrated internet security. They inspect all web traffic bi-directionally for malware and enforce security, compliance, and firewall policies, as described herein, as well as various additional functionality. In an embodiment, each enforcement node 3850 has two main modules for inspecting traffic and applying policies: a web module and a firewall module. The enforcement nodes 3850 are deployed around the world and can handle hundreds of thousands of concurrent users with millions of concurrent sessions. Because of this, regardless of where the users 3802 are, they can access the Internet from any device, and the enforcement nodes 3850 protect the traffic and apply corporate policies. The enforcement nodes 3850 can implement various inspection engines therein, and optionally, send sandboxing to another system. The enforcement nodes 3850 include significant fault tolerance capabilities, such as deployment in active-active mode to ensure availability and redundancy as well as continuous monitoring.

The central authority 3852 hosts all customer (tenant) policy and configuration settings. It monitors the cloud and provides a central location for software and database updates and threat intelligence. Given the multi-tenant architecture, the central authority 3852 is redundant and backed up in multiple different data centers. The enforcement nodes 3850 establish persistent connections to the central authority 3852 to download all policy configurations. When a new user connects to an enforcement node 3850, a policy request is sent to the central authority 3852 through this connection. The central authority 3852 then calculates the policies that apply to that user 3802 and sends the policy to the enforcement node 3850 as a highly compressed bitmap.

The cloud-based system 3800 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) may be used to describe application programs offered through cloud computing. A common shorthand for a provided cloud computing service (or even an aggregation of all existing cloud services) is "the cloud." The cloud-based system 3800 is illustrated herein as an example embodiment of a cloud-based system, and other embodiments are also contemplated.

As described herein, the terms cloud services and cloud applications may be used interchangeably. A cloud service is any service made available to users on-demand via the Internet, as opposed to being provided from a company's on-premises servers. A cloud application, or cloud app, is a software program where cloud-based and local components work together.

FIG. 39 is a block diagram of a server 3900, which may be used in the cloud-based system 3702 of FIG. 37, in the cloud-based system 3800 of FIG. 38, in other systems, or standalone. In various embodiments, the sever 3900 may also be used to the server 102 of FIG. 1. The enforcement nodes 3850 and the central authority 3852 of FIG. 38 may be formed as one or more of the servers 3900. The server 3900 may be a digital computer that, in terms of hardware architecture, generally includes a processor 3902, input/output (I/O) interfaces 3904, a network interface 3906, a data store 3908, and memory 3910. It should be appreciated by those of ordinary skill in the art that FIG. 39 depicts the server 3900 in an oversimplified manner, and a practical embodiment may include additional components and suitably configured processing logic to support known or conventional operating features that are not described in detail herein. The components (3902, 3904, 3906, 3908, and 3910) are communicatively coupled via a local interface 3912. The local interface 3912 may be, for example, but not limited to, one or more buses or other wired or wireless connections, as is known in the art. The local interface 3912 may have additional elements, which are omitted for simplicity, such as controllers, buffers (caches), drivers, repeaters, and receivers, among many others, to enable communications. Further, the local interface 3912 may include address, control, and/or data connections to enable appropriate communications among the aforementioned components.

The processor 3902 is a hardware device for executing software instructions. The processor 3902 may be any custom made or commercially available processor, a central processing unit (CPU), an auxiliary processor among several processors associated with the server 3900, a semiconductor-based microprocessor (in the form of a microchip or chipset), or generally any device for executing software instructions. When the server 3900 is in operation, the processor 3902 is configured to execute software stored within the memory 3910, to communicate data to and from the memory 3910, and to generally control operations of the server 3900 pursuant to the software instructions. The I/O interfaces 3904 may be used to receive user input from and/or for providing system output to one or more devices or components.

The network interface 3906 may be used to enable the server 3900 to communicate on a network, such as the Internet. The network interface 3906 may include, for example, an Ethernet card or adapter or a wireless local area network (WLAN) card or adapter. The network interface 3906 may include address, control, and/or data connections to enable appropriate communications on the network. A data store 3908 may be used to store data. The data store 3908 may include any of volatile memory elements such as random-access memory (RAM) (e.g., DRAM, SRAM, SDRAM, and the like), nonvolatile memory elements (e.g., ROM, hard drive, tape, CDROM, and the like), and combinations thereof.

Moreover, the data store 3908 may incorporate electronic, magnetic, optical, and/or other types of storage media. In one example, the data store 3908 may be located internal to the server 3900, such as, for example, an internal hard drive connected to the local interface 3912 in the server 3900.

Additionally, in another embodiment, the data store 3908 may be located external to the server 3900 such as, for example, an external hard drive connected to the I/O interfaces 3904 (e.g., SCSI or USB connection). In a further embodiment, the data store 3908 may be connected to the server 3900 through a network, such as, for example, a network-attached file server.

The memory 3910 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 3910 may incorporate electronic, magnetic, optical, and/or other types of storage media. Note that the memory 3910 may have a distributed architecture, where various components are situated remotely from one another but can be accessed by the processor 3902. The software in memory 3910 may include one or more software programs, each of which includes an ordered listing of executable instructions for implementing logical functions. The software in the memory 3910 includes a suitable Operating System (O/S) 3914 and one or more programs 3916. The operating system 3914 essentially controls the execution of other computer programs, such as the one or more programs 3916, and provides scheduling, input-output control, file and data management, memory management, and communication control and related services. The one or more programs 3916 may be configured to implement the various processes, algorithms, methods, techniques, etc. described herein.

FIG. 40 is a block diagram of a user device 4000, which may be used with the cloud-based system 3702 of FIG. 37, in the cloud-based system 3800 of FIG. 38, in other systems, or standalone. In various embodiments, the user device 4000 may also be used to implement any client devices described herein, such as the client devices shown in FIG. 1. Specifically, the user device 4000 can form a device used by one of the users, and this may include common devices such as laptops, smartphones, tablets, netbooks, personal digital assistants, MP3 players, cell phones, e-book readers, IoT devices, servers, desktops, printers, televisions, streaming media devices, and the like. The user device 4000 can be a digital device that, in terms of hardware architecture, generally includes a processor 4002, I/O interfaces 4004, a network interface 4006, a data store 4008, and memory 4010. It should be appreciated by those of ordinary skill in the art that FIG. 40 depicts the user device 4000 in an oversimplified manner, and a practical embodiment may include additional components and suitably configured processing logic to support known or conventional operating features that are not described in detail herein. The components (4002, 4004, 4006, 4008, and 4010) are communicatively coupled via a local interface 4012. The local interface 4012 can be, for example, but not limited to, one or more buses or other wired or wireless connections, as is known in the art. The local interface 4012 can have additional elements, which are omitted for simplicity, such as controllers, buffers (caches), drivers, repeaters, and receivers, among many others, to enable communications. Further, the local interface 4012 may include address, control, and/or data connections to enable appropriate communications among the aforementioned components.

The processor 4002 is a hardware device for executing software instructions. The processor 4002 can be any custom made or commercially available processor, a CPU, an auxiliary processor among several processors associated with the user device 4000, a semiconductor-based microprocessor (in the form of a microchip or chipset), or generally any device for executing software instructions. When the user device 4000 is in operation, the processor 4002 is configured to execute software stored within the memory 4010, to communicate data to and from the memory 4010, and to generally control operations of the user device 4000 pursuant to the software instructions. In an embodiment, the processor 4002 may include a mobile optimized processor such as optimized for power consumption and mobile applications. The I/O interfaces 4004 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 4006 enables wireless communication to an external access device or network. Any number of suitable wireless data communication protocols, techniques, or methodologies can be supported by the network interface 4006, including any protocols for wireless communication. The data store 4008 may be used to store data. The data store 4008 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 4008 may incorporate electronic, magnetic, optical, and/or other types of storage media.

The memory 4010 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 4010 may incorporate electronic, magnetic, optical, and/or other types of storage media. Note that the memory 4010 may have a distributed architecture, where various components are situated remotely from one another but can be accessed by the processor 4002. The software in memory 4010 can include one or more software programs, each of which includes an ordered listing of executable instructions for implementing logical functions. The software in the memory 4010 includes a suitable operating system 4014 and program(s) 4016. The operating system 4014 essentially controls the execution of other computer programs and provides scheduling, input-output control, file and data management, memory management, and communication control and related services. The programs 4016 may include various applications, add-ons, etc. configured to provide end user functionality with the user device 4000. For example, example programs 4016 may include, but not limited to, a web browser, social networking applications, streaming media applications, games, mapping and location applications, electronic mail applications, financial applications, and the like. In a typical example, the end-user typically uses one or more of the programs 4016 along with a network such as the cloud-based system 3700.

The present disclosure provides an application or cloud application in which users are able to schedule meetings at a date and time which accommodates each participant. It will be appreciated that the application of the present disclosure may be used to schedule any activity requiring attendance of multiple participants. The meeting scheduling example of the present disclosure shall be construed as a non-limiting example. The application may be accessed on a user device such as laptops, smartphones, tablets, netbooks, personal digital assistants, MP3 players, cell phones, e-book readers, IoT devices, servers, desktops, printers, televisions, streaming media devices, and the like. Users may create a profile on the application on which the users will provide information such as general meeting availability and scheduling. A profile created for the application may be linked to other profiles such as a user's Google account/profile and others of the like. Once a user has registered with the application and created a profile, the user is then able to collaborate with team members on the application and utilize the scheduling process.

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

The foregoing sections include headers for various embodiments and those skilled in the art will appreciate these various embodiments may be used in combination with one another as well as individually. Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A system comprising:

one or more processors; and logic encoded in one or more non-transitory computer-readable storage media for execution by the one or more processors, including a central authority and at least one edge node, and when executed operable to cause the one or more processors to perform operations comprising:

receiving a message from a user device at an edge node of the at least one edge node, wherein the message includes an invite list of at least one participant;

parsing, utilizing a Flask-powered interactive voice response program and a transformer model executed at the edge node, the message;

persisting a state of a conversation including the message by saving the state of the conversation in memory of the at least one edge node such that accessing the at least one edge node continues the conversation without retrieving information indicating the state of the conversation from the central authority;

sending at least one invitation message to at least one participant user device of the at least one participant, wherein the at least one invitation message provides acceptance options;

generating a human-like response in a user interface of the at least one participant user device;

enabling in the user interface a conversation between the human-like response and the at least one participant;

receiving, from the at least one participant user device of the at least one participant during the conversation, one or more questions about the invitation message;

parsing, utilizing the Flask-powered interactive voice response program and the transformer model executed at the edge node or an additional edge node of the at least one edge node, the one or more questions;

persisting an updated state of the conversation including the one or more questions by saving the updated state of the conversation in the memory of the edge node or the additional edge node such that accessing the edge node or the additional edge node continues the conversation without retrieving information indicating the updated state of the conversation from the central authority; and sending, to the at least one participant user device of the at least one participant during the conversation, information responsive to the one or more questions about the invitation message.

2. The system of claim 1, wherein the logic when executed is further operable to cause the one or more processors to perform operations comprising configuring the human-like response to be a human-like avatar having one or more of a human-like voice response and a human-like video response.

3. The system of claim 1, wherein the logic when executed is further operable to cause the one or more processors to perform operations comprising integrating the system over a plurality of communication platforms, wherein the plurality of communication platforms comprises advertising platforms, voice platforms, and messaging platforms.

4. The system of claim 1, wherein the logic when executed is further operable to cause the one or more processors to perform operations comprising enabling the at least one participant to ask the one or more questions using natural language.

5. The system of claim 1, wherein the logic when executed is further operable to cause the one or more processors to perform operations comprising enabling point and click options in the user interface for interaction options during the conversation.

6. The system of claim 1, wherein the information responsive to the one or more questions about the invitation message comprises one or more of website links and a quick response code.

7. The system of claim 1, wherein the logic when executed is further operable to cause the one or more processors to perform operations comprising utilizing a spreadsheet for processing the one or more questions about the invitation message and for fetching information responsive to the one or more questions.

8. The system of claim 1, wherein the message initiates a meeting to be scheduled, wherein the acceptance options include meeting acceptance options, and wherein the one more questions about the invitation message includes one or more question about a user associated with the user device.

9. The system of claim 1, wherein the logic when executed is further operable to cause the one or more processors to perform operations comprising:

sending, from the central authority, policy information associated with the user device to the edge node in response to the user device connecting to the edge node; and sending, from the central authority, policy information associated with a participant user device of the at least participant user device to the edge node or the additional edge node in response to the participant user device connecting to the edge note or the additional edge node.

10. A non-transitory computer-readable storage medium with program instructions stored thereon, the program instructions when executed by one or more processors, including a central authority and at least one edge node, are operable to cause the one or more processors to perform operations comprising:

receiving a message from a user device at an edge node of the at least one edge node, wherein the message includes an invite list of at least one participant;

parsing, utilizing a Flask-powered interactive voice response program and a transformer model executed at the edge node, the message;

persisting a state of a conversation including the message by saving the state of the conversation in memory of the at least one edge node such that accessing the at least one edge node continues the conversation without retrieving information indicating the state of the conversation from the central authority;

sending at least one invitation message to at least one participant user device of the at least one participant, wherein the at least one invitation message provides acceptance options;

generating a human-like response in a user interface of the at least one participant user device;

enabling in the user interface a conversation between the human-like response and the at least one participant;

receiving, from the at least one participant user device of the at least one participant during the conversation, one or more questions about the invitation message;

parsing, utilizing the Flask-powered interactive voice response program and the transformer model executed at the edge node or an additional edge node of the at least one edge node, the one or more questions;

persisting an updated state of the conversation including the one or more questions by saving the updated state of the conversation in the memory of the edge node or the additional edge node such that accessing the edge node or the additional edge node continues the conversation without retrieving information indicating the updated state of the conversation from the central authority; and sending, to the at least one participant user device of the at least one participant during the conversation, information responsive to the one or more questions about the invitation message.

11. The computer-readable storage medium of claim 10, wherein the instructions when executed are further operable to cause the one or more processors to perform operations comprising configuring the human-like response to be a human-like avatar having one or more of a human-like voice response and a human-like video response.

12. The computer-readable storage medium of claim 10, wherein the instructions when executed are further operable to cause the one or more processors to perform operations comprising integrating the system over a plurality of communication platforms, wherein the plurality of communication platforms comprises advertising platforms, voice platforms, and messaging platforms.

13. The computer-readable storage medium of claim 10, wherein the instructions when executed are further operable to cause the one or more processors to perform operations comprising enabling the at least one participant to ask the one or more questions using natural language.

14. The computer-readable storage medium of claim 10, wherein the instructions when executed are further operable to cause the one or more processors to perform operations comprising enabling point and click options in the user interface for interaction options during the conversation.

15. The computer-readable storage medium of claim 10, wherein the information responsive to the one or more questions about the invitation message comprises one or more of website links and a quick response code.

16. The computer-readable storage medium of claim 10, wherein the instructions when executed are further operable to cause the one or more processors to perform operations comprising utilizing a spreadsheet for processing the one or more questions about the invitation message and for fetching information responsive to the one or more questions.

17. A computer-implemented method for providing an artificial intelligence agent, the method comprising:

receiving a message from a user device at an edge node of the at least one edge node, wherein the message includes an invite list of at least one participant;

parsing, utilizing a Flask-powered interactive voice response program and a transformer model executed at the edge node, the message;

persisting a state of a conversation including the message by saving the state of the conversation in memory of the at least one edge node such that accessing the at least one edge node continues the conversation without retrieving information indicating the state of the conversation from the central authority;

sending at least one invitation message to at least one participant user device of the at least one participant, wherein the at least one invitation message provides acceptance options;

generating a human-like response in a user interface of the at least one participant user device;

enabling in the user interface a conversation between the human-like response and the at least one participant;

receiving, from the at least one participant user device of the at least one participant during the conversation, one or more questions about the invitation message;

parsing, with the artificial intelligence agent and utilizing the Flask-powered interactive voice response program and the transformer model executed at the edge node or an additional edge node of the at least one edge node, the one or more questions;

persisting an updated state of the conversation including the one or more questions by saving the updated state of the conversation in the memory of the edge node or the additional edge node such that accessing the edge node or the additional edge node continues the conversation without retrieving information indicating the updated state of the conversation from the central authority; and sending, to the at least one participant user device of the at least one participant during the conversation, information responsive to the one or more questions about the invitation message.

18. The method of claim 17, further comprising integrating the system over a plurality of communication platforms, wherein the plurality of communication platforms comprises advertising platforms, voice platforms, and messaging platforms.

* * * * *